(12) United States Patent
Bowers et al.

(10) Patent No.: US 9,715,129 B2
(45) Date of Patent: Jul. 25, 2017

(54) CONTACT LENS WITH MULTI-LAYERED PATTERN

(71) Applicant: Johnson & Johnson Vision Care, Inc., Jacksonville, FL (US)

(72) Inventors: Angie L. Bowers, Jacksonville, FL (US); Dawn D. Wright, St. Augustine, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 0 days.

(21) Appl. No.: 14/687,321

(22) Filed: Apr. 15, 2015

(65) Prior Publication Data

US 2016/0306189 A1    Oct. 20, 2016

(51) Int. Cl.
*G02C 7/04* (2006.01)
*G02C 7/02* (2006.01)

(52) U.S. Cl.
CPC ............... *G02C 7/021* (2013.01); *G02C 7/04* (2013.01); *G02C 7/046* (2013.01)

(58) Field of Classification Search
CPC .................................. G02C 7/021; G02C 7/04
USPC ........................................................ 351/159
See application file for complete search history.

(56) References Cited

U.S. PATENT DOCUMENTS

| 7,246,903 | B2 | 7/2007 | Bowers et al. |
| 7,278,736 | B2 | 10/2007 | Ocampo et al. |
| 2002/0167640 | A1 | 11/2002 | Francis |
| 2003/0025873 | A1 | 2/2003 | Ocampo |
| 2004/0119939 | A1 | 6/2004 | Clark |
| 2011/0141433 | A1 | 6/2011 | Streibig |

(Continued)

FOREIGN PATENT DOCUMENTS

| EP | 357062 A2 | 3/1990 |
| EP | 2687897 A1 | 1/2014 |

OTHER PUBLICATIONS

European Search Report for corresponding EPA No. 16165228.4 dated Sep. 14, 2016.

*Primary Examiner* — Bumsuk Won
*Assistant Examiner* — Grant Gagnon
(74) *Attorney, Agent, or Firm* — Carl J. Evens

(57) ABSTRACT

Contact lenses that comprise a multi-layer design may be utilized to enhance and/or highlight the appearance of the eyes upon which the contact lenses are positioned while maintaining a natural look. These exemplary designs each comprise three layers; namely, a unique limbal design graphic, a unique inner effect graphic and a unique outer effect graphic. The layers may be formed utilizing any number of design elements and design principles. The limbal design graphic is the portion of the overall pattern that surrounds the outer diameter of the iris and is closest to the sclera and is meant to highlight, enhance and/or define the limbal region of the eye; however, it also comprises elements that extend into the iris. The inner effect graphic layer is the portion of the overall pattern that is meant to enhance the iris; however, it may comprise a portion that also contributes to highlighting, enhancing and/or defining the limbal region of the eye. The outer effect graphic layer is the portion of the overall pattern that is meant to enhance the iris; however, it may comprise a portion that also contributes to highlighting, enhancing and/or defining the limbal region of the eye.

13 Claims, 29 Drawing Sheets

(56) References Cited

U.S. PATENT DOCUMENTS

| | | | |
|---|---|---|---|
| 2012/0026459 A1* | 2/2012 | Tucker | B29D 11/00903 351/159.24 |
| 2012/0069254 A1* | 3/2012 | Burton | G02C 7/046 349/13 |
| 2012/0147319 A1* | 6/2012 | Corti | G02C 7/046 351/159.3 |
| 2014/0016084 A1* | 1/2014 | Bowers | G02C 7/046 351/159.31 |
| 2014/0253871 A1* | 9/2014 | Rosser | G02C 7/046 351/159.24 |
| 2014/0346695 A1* | 11/2014 | Pugh | A61B 5/7445 264/2.6 |
| 2015/0160475 A1* | 6/2015 | Yang | G02C 7/04 351/159.03 |
| 2015/0248019 A1* | 9/2015 | Caldarise | G02C 7/04 351/159.02 |
| 2015/0362757 A1* | 12/2015 | Fu | G02C 7/04 351/159.29 |

* cited by examiner

1460

1560

1660

1760

1860

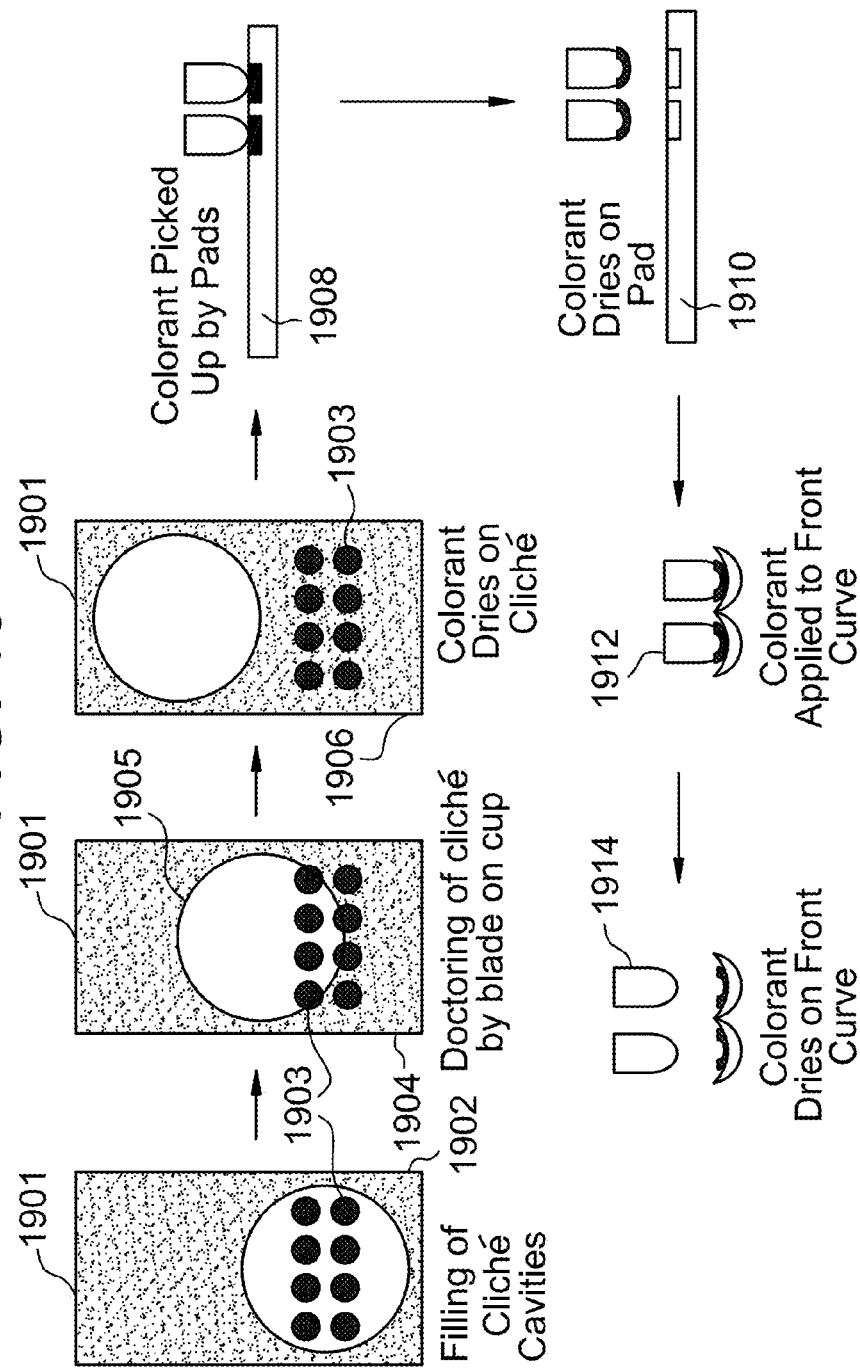

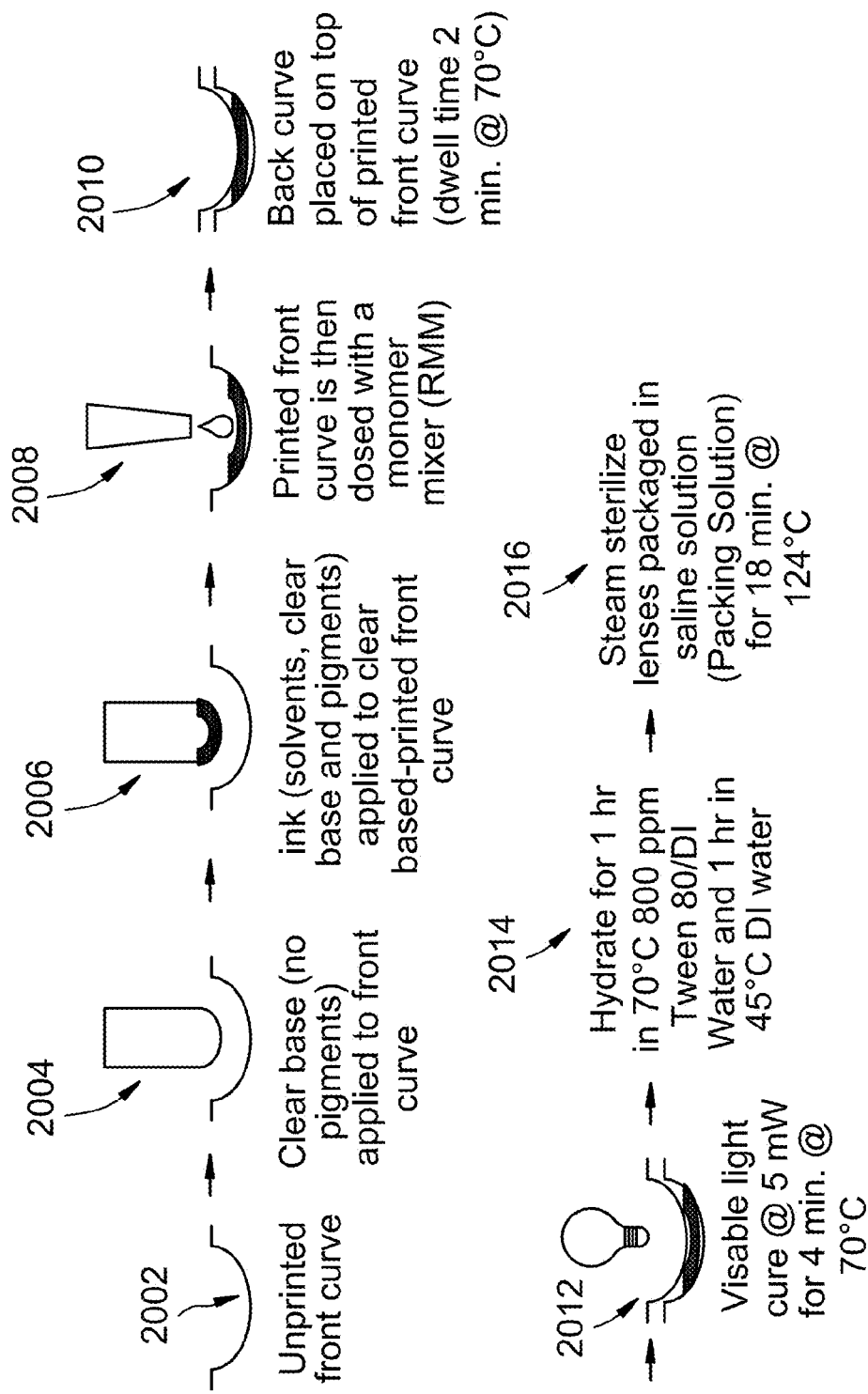

CONTACT LENS WITH MULTI-LAYERED PATTERN

BACKGROUND OF THE INVENTION

1. Field of the Invention

The present invention relates to ophthalmic lenses, and more particularly to cosmetic contact lenses incorporating multiple effect layers to enhance the appearance of the eyes upon which the contact lenses are positioned and comprising designs to imply and demonstrate depth within a given pattern, to create variations within the iris region, to alter the color of the iris, to enlarge the iris, and to create negative space to allow the natural iris to contribute to the effect of the overall design. The overall design is a composite of varying degrees of overlapping translucent layers.

2. Discussion of the Related Art

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses made or fabricated from hard materials were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeability values and are generally more comfortable to wear than the contact lenses made of the earlier hard materials. Rigid gas permeable hard contact lenses, on the other hand, are made from siloxane-containing polymers but are more rigid than soft contact lenses and thus hold their shape and are more durable.

Currently available contact lenses remain a cost effective means for vision correction. The thin plastic lenses fit over the cornea of the eye to correct vision defects, including myopia or nearsightedness, hyperopia or farsightedness, astigmatism, i.e. asphericity in the cornea, and presbyopia i.e. the loss of the ability of the crystalline lens to accommodate. Contact lenses are available in a variety of forms and are made of a variety of materials to provide different functionality. Daily wear soft contact lenses are typically made from soft polymer materials combined with water for oxygen permeability. Daily wear soft contact lenses may be daily disposable or extended wear disposable. Daily disposable contact lenses are usually worn for a single day and then thrown away, while extended wear disposable contact lenses are usually worn for a period of up to thirty days. Colored soft contact lenses use different materials to provide different functionality. For example, a visibility tint contact lens uses a light tint to aid the wearer in locating a dropped contact lens, enhancement tint contact lenses have a transparent or translucent tint that is meant to enhance one's natural eye color, the color tint contact lens comprises an opaque tint meant to change one's eye color, and the light filtering tint contact lens functions to enhance certain colors while muting others. Bifocal and multifocal contact lenses are designed specifically for patients with presbyopia and are available in both soft and rigid varieties. Toric contact lenses are designed specifically for patients with astigmatism and are also available in both soft and rigid varieties. Combination lenses combining different aspects of the above are also available, for example, hybrid contact lenses.

Cosmetic contact lenses may comprise patterns composed of one or more elements that completely, or more preferably, partially overlie the wearer's iris. These lenses may also comprise a limbal ring. A limbal ring is essentially an annular band of color that when the lens is on the eye and centered, partially or completely overlies the lens wearer's limbal region which is the junction of the sclera and the cornea. The inclusion of a limbal ring may make the iris appear larger, darker and/or more defined. The combination of the limbal ring and an iris pattern makes the appearance of the lens on eye more natural. In other words, an iris pattern allows the limbal ring to blend in naturally with the wearer's eyes and the combination of an iris pattern and a limbal ring creates blending, depth, contrast and definition.

Other cosmetic contact lenses focus on the sclera rather than or in addition to the iris. For example, a contact lens may comprise a brightly colored peripheral portion, i.e. outside of the iris region, that may be opaque, semi-opaque and/or translucent. The bright portion may extend from the edge of the limbus to the edge of the contact lens creating the impression of a brighter or whiter sclera. These contact lenses may also include a limbal ring which as stated above, may make the iris appear larger, darker and/or more defined than it would otherwise.

While the above described cosmetic contact lenses do enhance eye appearance, there exists a need in the cosmetic lens area for lenses comprising designs to imply and demonstrate depth within a given pattern, to create variations within the iris region, to alter the color of the iris, to enlarge the iris, and to create negative space to allow the natural iris to contribute to the effect of the overall design.

SUMMARY OF THE INVENTION

The contact lens with a multi-layered pattern of the present invention overcomes the issues briefly set forth above.

In accordance with one aspect, the present invention is directed to an eye enhancement contact lens. The eye enhancement contact lens comprising a clear base material, a first design graphic deposited on at least a portion of the clear base material, a second design graphic deposited on at least a portion of the first design graphic and on at least a portion of the clear base material, a third design graphic deposited on at least a portion of the second design graphic, on at least a portion of the first design graphic and on at least a portion of the clear base material, and bulk lens material, wherein the first, second and third design graphics being enclosed within the bulk lens material and the clear base material.

In accordance with another aspect, the present invention is directed to an eye enhancement contact lens. The eye enhancement contact lens comprising an optic zone, a peripheral zone surrounding the optic zone, and a substantially annular design arrangement formed from a first design graphic deposited on a clear base layer, a second design graphic deposited on at least a portion of the first design graphic and on at least a portion of the clear base layer and a third design graphic deposited on at least a portion of the second design graphic, on at least a portion of the first design graphic and on at least a portion of the clear base layer, the substantially annular design arrangement being positioned within the peripheral zone, wherein the first, second and third design graphics are enclosed within a bulk lens material and the clear base layer.

Cosmetic contact lenses may be designed to alter the appearance of the eyes upon which they are worn in any number of ways, including the color of the entire eye and/or different regions of the eye. While not a requirement, cosmetic contact lenses may also be utilized to correct refractive error. Cosmetic contact lenses may also have a direct medical application. For example, cosmetic contact lenses may be utilized to restore the appearance of a damaged eye. Cosmetic contact lenses may include transparent, translucent, opaque-color enhancements or tints. Tints may include organic/inorganic pigments, dyes or special effect pigments. Printed regions on the contact lens may include the iris region (iris patterns), the limbal region (limbal rings), the scleral region (sclera brightening), or any combination thereof. In addition, patterns may be continuous, intermittent or any combination thereof.

The cosmetic contact lenses of the present invention utilize multiple effect layers to achieve a unique visual appearance. The multi-layer design may be utilized to enhance and/or highlight the appearance of the eyes upon which the contact lenses are positioned while maintaining a natural look. These exemplary designs each comprise three layers; namely, a unique limbal design graphic, a unique inner effect graphic and a unique outer effect graphic. The layers may be formed utilizing any number of design elements and design principles. For example, lines may be utilized to define shapes and create contours that imitate or mimic line structures, shapes and contours found in a natural iris. Color and hue values with varying levels of translucency and opacity may be utilized to create blending and contrast while varying color and hues may be utilized to imply depth by forming highlight and shadow. Space may be utilized to determine composition, for example, positive space may be utilized to define and imply effects while negative space may be utilized to allow the natural iris to contribute to the effect of the overall pattern. Perspective in overlapping layers may be utilized to imply and demonstrate depth within a given pattern. Texture may be utilized to create variation in the iris. As used in two dimensional art, texture is created by the use of light and dark. Light and dark elements, as well as overlapping elements, may also be utilized to imply depth and form.

As stated above, the present invention utilizes three distinct layers to provide more depth and variation in the overall pattern. The limbal design graphic is the portion of the overall pattern that surrounds the outer diameter of the iris and is closest to the sclera and is meant to highlight, enhance and/or define the limbal region of the eye; however, it also comprises elements that extend into the iris. The inner effect graphic layer is the portion of the overall pattern that is meant to enhance the iris; however, it may comprise a portion that also contributes to highlighting, enhancing and/or defining the limbal region of the eye. The outer effect graphic layer is the portion of the overall pattern that is meant to enhance the iris; however, it may comprise a portion that also contributes to highlighting, enhancing and/or defining the limbal region of the eye. The multiple layer approach of the present invention may be utilized to create varying levels of transparency and/or opacity utilizing overlapping and non-overlapping translucent layers.

The cosmetic contact lenses of the present invention provide a cost effective means to enhance the visual appearance of a wearer's eyes while providing the optical quality and comfort of a non-cosmetic contact lens.

BRIEF DESCRIPTION OF THE DRAWINGS

The foregoing and other features and advantages of the invention will be apparent from the following, more particular description of preferred embodiments of the invention, as illustrated in the accompanying drawings.

FIG. 19 is a diagrammatic representation of a generalized pad printing process.

FIG. 20 is a diagrammatic representation of a more detailed pad printing process.

DETAILED DESCRIPTION OF THE PREFERRED EMBODIMENTS

Contact lenses or contacts are simply lenses placed on the eye. Contact lenses are considered medical devices and may be worn to correct vision and/or for cosmetic or other therapeutic reasons. Contact lenses have been utilized commercially to improve vision since the 1950s. Early contact lenses made or fabricated from hard materials were relatively expensive and fragile. In addition, these early contact lenses were fabricated from materials that did not allow sufficient oxygen transmission through the contact lens to the conjunctiva and cornea which potentially could cause a number of adverse clinical effects. Although these contact lenses are still utilized, they are not suitable for all patients due to their poor initial comfort. Later developments in the field gave rise to soft contact lenses, based upon hydrogels, which are extremely popular and widely utilized today. Silicone hydrogel contact lenses that are available today combine the benefit of silicone, which has extremely high oxygen permeability, with the proven comfort and clinical performance of hydrogels. Essentially, these silicone hydrogel based contact lenses have higher oxygen permeabilities and are generally more comfortable to wear than the contact lenses made of the earlier hard materials. However, these new contact lenses are not totally without limitations.

Figure 1:
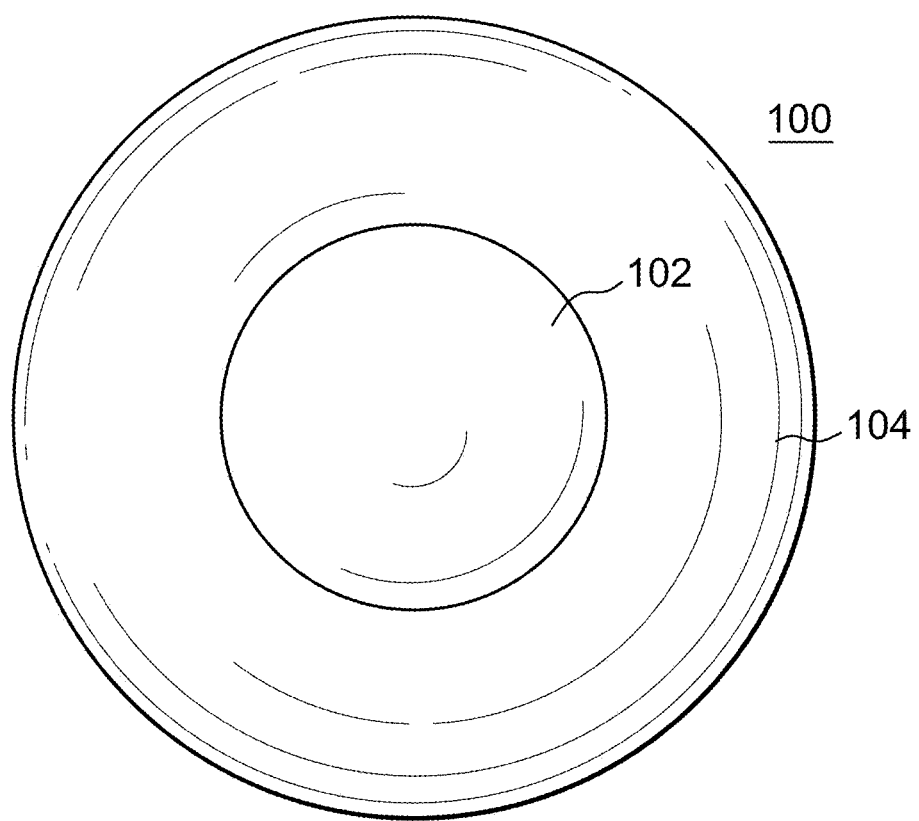
FIG. 1 is a plan view of an exemplary non-cosmetic contact lens.

Referring now to FIG. 1, there is illustrated a plan view of an exemplary non-cosmetic contact lens 100. The contact lens 100 comprises an optic zone 102, a peripheral zone 104 surrounding the optic zone 102, a back curve surface designed to make contact with an individual's eye when worn and a front curve surface opposite the back curve surface. The optic zone 102 is the portion of the contact lens 100 through which vision correction may be obtained. In other words, the optic zone 102 provides vision correction and is designed for a specific need such as single vision myopia or hyperopia correction, astigmatism vision correction, bi-focal vision correction, multi-focal vision correction, custom correction or any other design that may provide vision correction. The peripheral zone 104 surrounds the optic zone 102 and provides mechanical stability for the contact lens 100 on the eye. In other words, the peripheral zone 104 provides mechanical features which influence positioning and stabilization of the contact lens 100 on the eye, including centration and orientation. Orientation is fundamental when the optic zone 102 includes non-rotationally symmetric features, such as astigmatic correction and/or high order aberration correction. In some contact lens designs, an optional intermediate zone between the optic zone 102 and the peripheral zone 104 may be utilized. The optional intermediate zone ensures that the optic zone 102 and the peripheral zone 104 are smoothly blended.

The lens 100 illustrated in FIG. 1 is circular, but may be any convenient shape for a contact lens, such as an elliptical or truncated circular shape. In addition to being round or non-round, the contact lens 100 may be planar or non-planar.

A cosmetic contact lens is designed to enhance or alter the appearance of the eye upon which it is worn. While not a requirement, cosmetic contact lenses may also be utilized for the correction of refractive error. In addition, cosmetic contact lenses may also have direct medical application, for example, to restore the appearance of a damaged eye. Individuals who suffer from aniridia, the absence of an iris, dyscoria, damage of the iris, and/or arcus senilis or arcus senilus corneae, a disorder that lightens or discolors the limbus area, may utilize colored contact lenses that will give the appearance of a complete iris. Cosmetic contact lenses may include translucent/transparent color enhancement, tint, opaque color tint, artificial iris patterns, limbal rings, sclera brightening tints and/or any combination of the above.

More specifically, cosmetic contact lenses may be utilized to brighten the sclera and/or have a pattern that includes a limbal ring that serves to enhance the definition of the wearer's iris resulting in the iris appearing larger to viewers of the lens wearer. Additionally, cosmetic contact lenses may have additional pattern elements that completely or, preferably, partially overlie the wearer's iris. The cosmetic lenses may be utilized for enhancing a dark-eyed individual's iris, but also may be used to enhance the iris of a light-eyed lens wearer as well.

Figure 2:
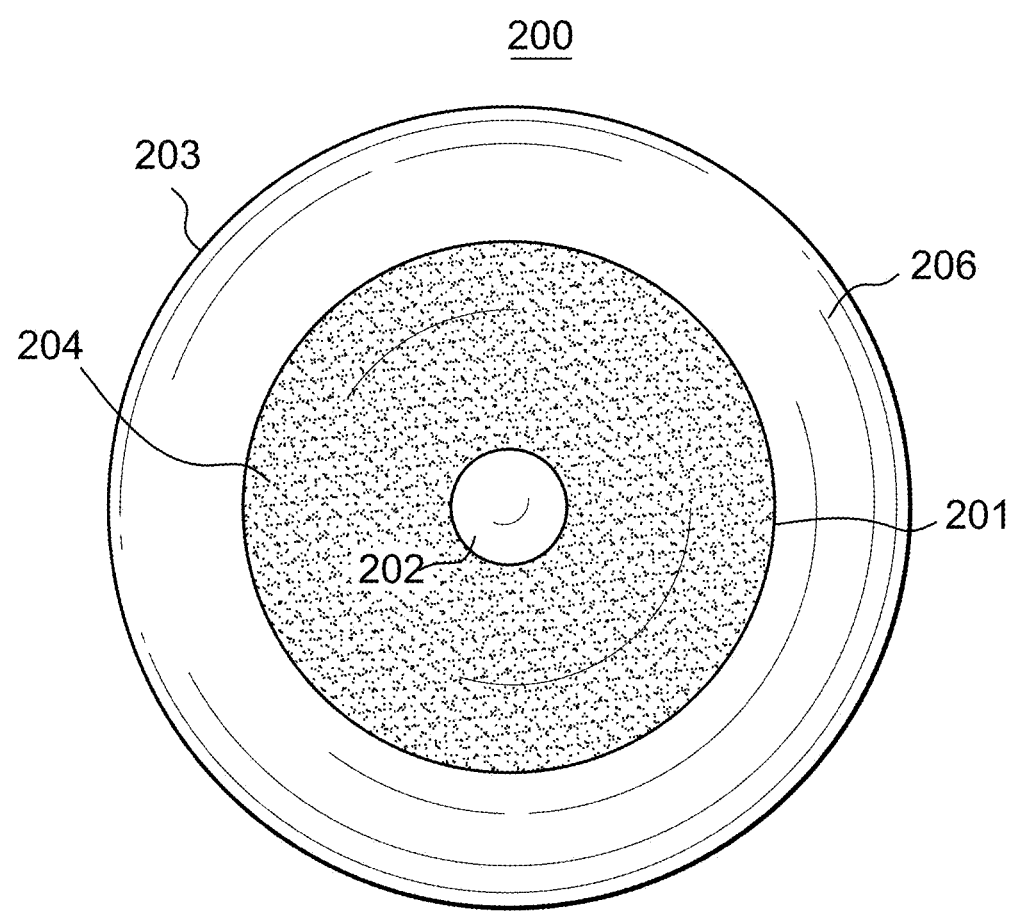
FIG. 2 is a plan view of a first exemplary cosmetic contact lens.

Referring to FIG. 2, there is illustrated a first exemplary cosmetic contact lens 200. While this lens 200 comprises an optic zone and a peripheral zone within the meaning set forth above with respect to the contact lens 100 of FIG. 1, different terms are utilized to describe the various regions of a cosmetic contact lens. The cosmetic contact lens 200 comprises a center region 202 that is sized to substantially correspond to the size and location of an individual pupil. The center region 202 typically has no coloring or design so as not to interfere with visual acuity. A central portion 204 surrounds the center region 202 and is sized to substantially correspond to the size and location of an individual's iris. The central portion 204 may comprise one or more colors and/or a pattern formed by one or more colors to enhance the appearance of the wearer's iris. Disposed about the central portion 204 and extending to the surrounding edge of the contact lens 200 is a peripheral portion 206. The peripheral portion 206 comprises an annular shape with an inner diameter measured from point 201 and an outer diameter measured from point 203 which may, but need not necessarily coincide with the outer edge of the contact lens 200 as a whole. The peripheral portion 206 may be colored with a bright color, for example, white, near white, off white, light yellow, pale blue, light pink, light green or any combination of the above. The bright colors are disposed so as to blend gradually with the wearer's sclera.

The peripheral portion 206 is colored to enhance the appearance of the sclera. The coloring of the peripheral portion 206 may be opaque, translucent, or somewhere between the two, or semi-opaque. Exemplary embodiments enhance the appearance of the sclera by providing the sclera with a refreshed, natural appearance. Opaque as utilized herein shall be understood to mean a color that permits an average light transmittance in the 380 to 780 nm range of 0 to about 50 percent, and preferably 7 to about 50 percent. Translucent as utilized herein shall be understood to mean a color that permits an average light transmittance in the 380 to 780 nm range of about 50 to about 85 percent, and preferably from about 65 to about 85 percent.

Figure 3:
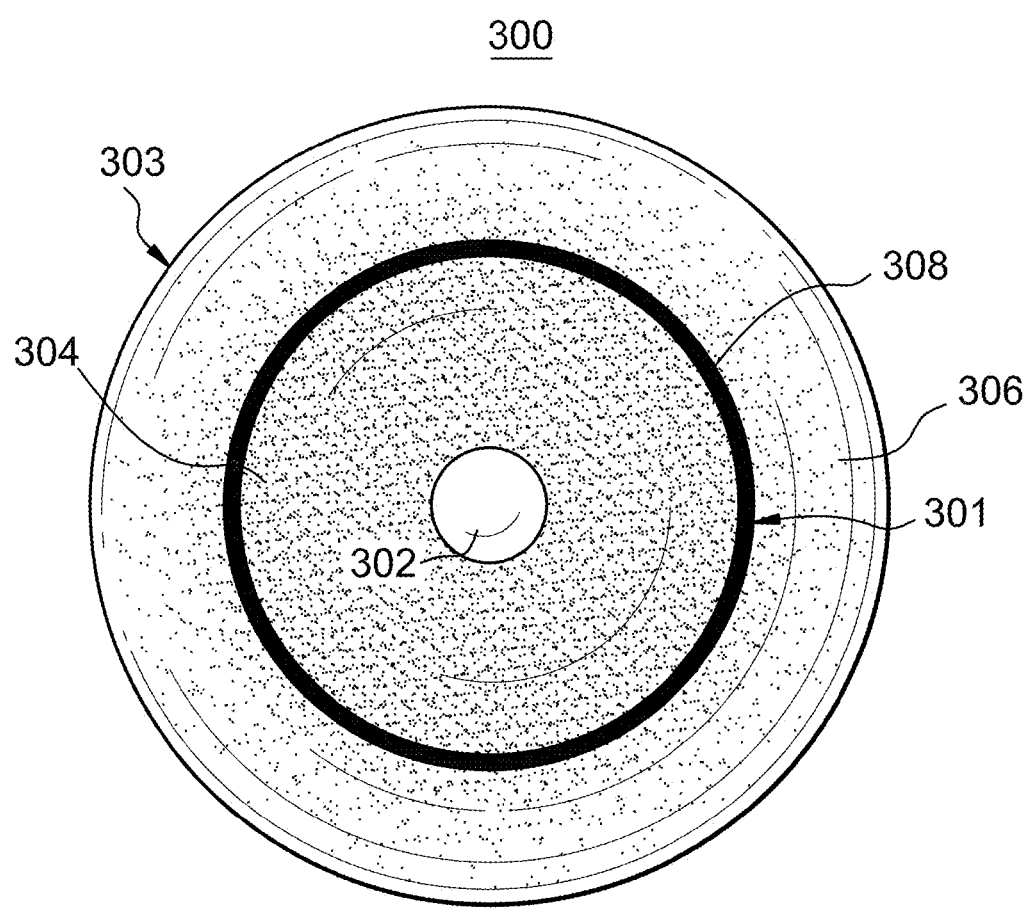
FIG. 3 is a plan view of a second exemplary cosmetic contact lens.

FIG. 3 illustrates a second exemplary cosmetic contact lens 300. The cosmetic contact lens 300 comprises a center region 302, a central portion 304 that surrounds the center region 302, a peripheral portion 306 that surrounds the central portion 304 and a limbal ring 308. As set forth herein, a limbal ring is essentially an annular band of color that, when the lens is on the eye and centered, partially or completely overlies the lens wearer's limbal region. In some exemplary embodiments, a limbal ring may be larger to create a halo effect. In this exemplary embodiment, the coloring in the peripheral portion 306 is or may be graduated from opaque to translucent or transparent from the inner diameter measured from point 301 to the outer diameter measured from point 303. As in the previously described exemplary embodiment, the central portion 304 may comprise one or more colors and/or a pattern formed by one or more colors to enhance the appearance of the wearer's iris. This combination provides the most natural iris along with the contrast of a dark limbal ring, while providing the additional benefit of a bright coloring applied in the peripheral portion 306. The limbal ring 308 may be of any suitable width or pattern that allows the ring 308 to blend naturally with the iris, the central portion coloring/pattern 304 and the bright colored peripheral portion 306. The limbal ring 308 may be translucent or opaque.

Figure 4:
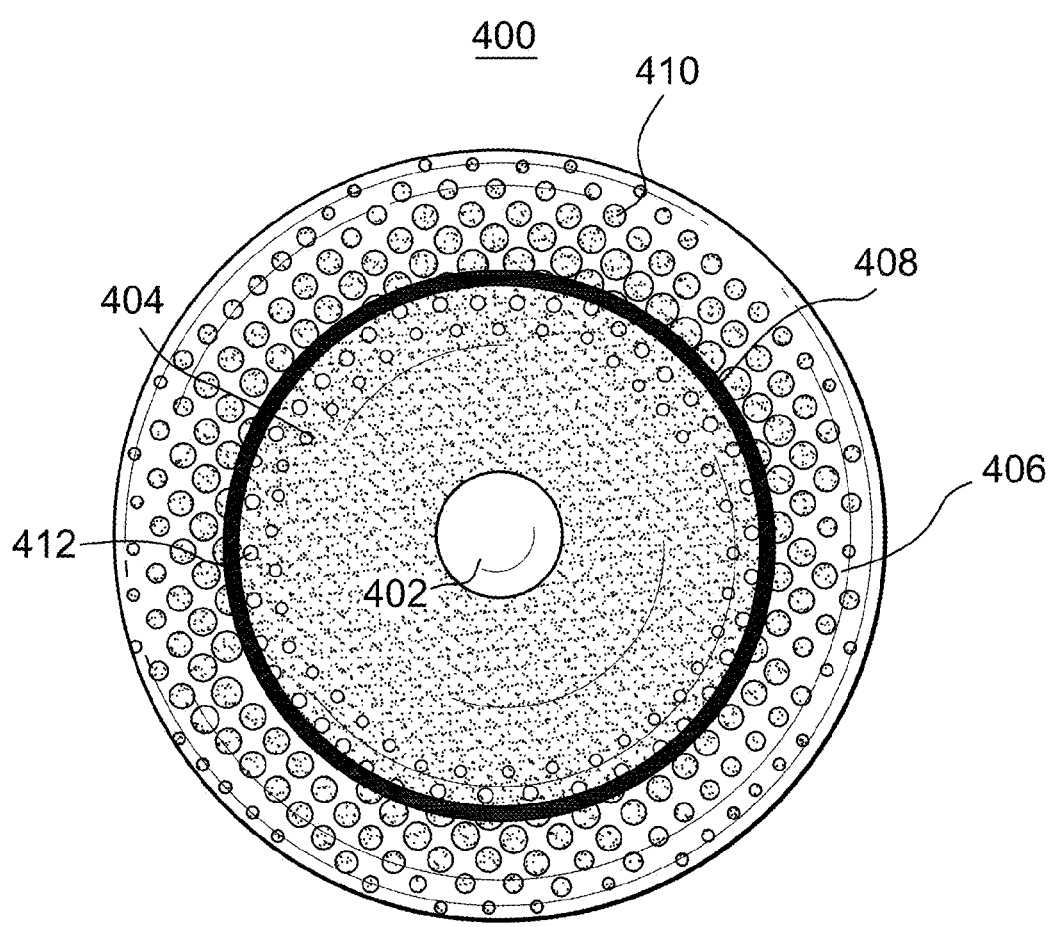
FIG. 4 is a plan view of a third exemplary cosmetic contact lens.

FIG. 4 illustrates a third exemplary cosmetic contact lens 400 with a bright coloring in the peripheral portion 406 applied in the form of a geometric pattern. The cosmetic contact lens 400 comprises a center region 402, a central portion 404 that surrounds the center region 402, the peripheral portion 406 that surrounds the central portion 404 and a limbal ring 408. The difference between the contact lens of FIGS. 3 and 4 lies in the geometric pattern in the peripheral portion 406. In this exemplary cosmetic lens 400, the geometric pattern takes on the appearance of circles 410 removed from the lens surface that would otherwise be colored white, so that each circle 410 touches its neighboring circle 410 at a tangent proximate the limbal ring 408 and separates at the extreme outer diameter of the pattern in order to blend with the natural sclera. In a preferred embodiment, the sclera print, the region corresponding to the peripheral portion 406 goes from opaque at the limbal edge to a matrixed pattern to blend with the natural sclera. While this exemplary embodiment utilizes circles 410 as the geometric shape, it is important to note that any geometric shape may be utilized. It may also be thought of as rows and columns of cross shaped brightly colored structures formed by the circles 410. As illustrated, circles 412 may also extend into the pattern in the central portion 404.

Figure 5:
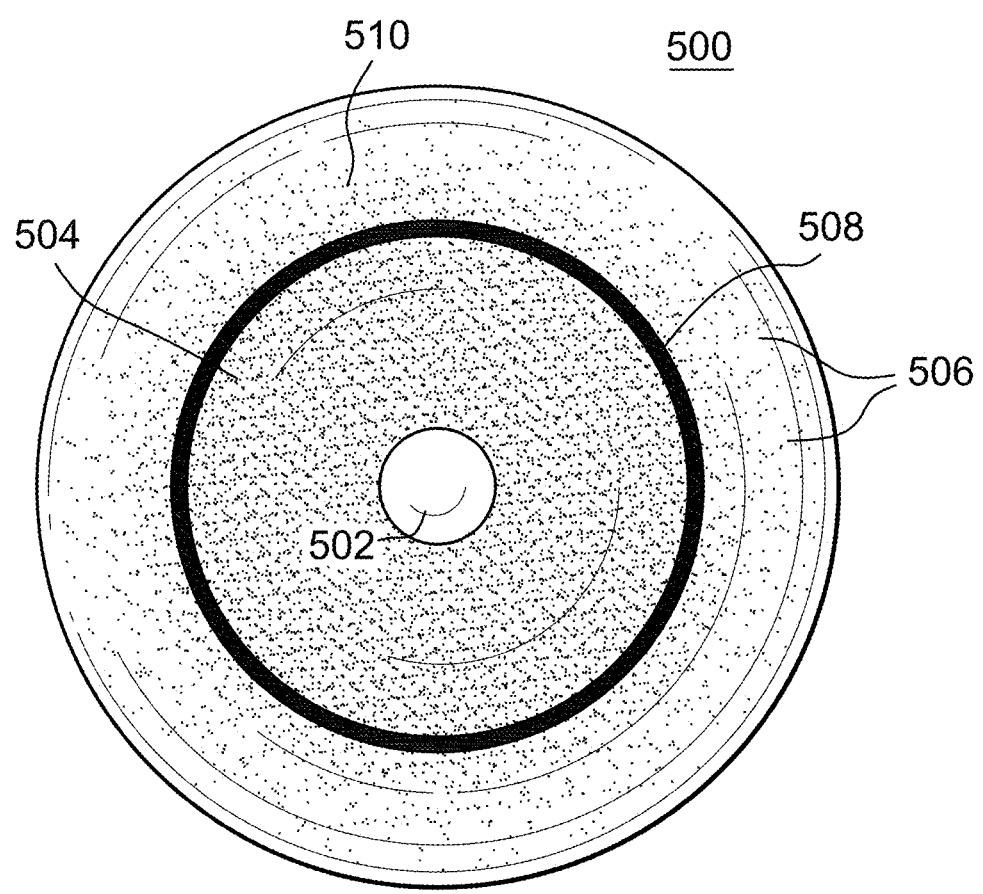
FIG. 5 is a plan view of a fourth exemplary cosmetic contact lens.

Patterning comprising geometric shapes may be formed from regularly shaped structures as described above with respect to FIG. 4, or from a plurality of random dots or shapes 510 which are in both the central portion 504 and the peripheral portion 506 of a cosmetic contact lens 500 as illustrated in FIG. 5. The central region 502 and the limbal ring 508 do not have patterns in this exemplary contact lens 500, for example, no spokes or blending. Any convenient shapes for conveying a realistic or enhanced sense of color may be utilized, particularly, where such geometric shapes contribute to a desired hue or shade. The dots utilized may comprise any size and shape. Dots aid in blending of the boarders of the different elements of the cosmetic contact lenses.

In accordance with other exemplary embodiments, a cosmetic lens may comprise a limbal ring and a plurality of tapered spokes. As set forth above, a limbal ring is an annular band of color that, when the lens is on-eye and centered, partially or substantially completely overlies the lens wearer's limbal region, or the junction of the sclera with the cornea. Preferably, the limbal ring substantially completely overlies the limbal region. The innermost border or edge closest to the geometric center of the lens, of the limbal ring may form a circle having a diameter of about 8 mm to about 12 mm, preferably about 9 to about 11 mm, the circle being centered at the lens' geometric center. The ring may be of any suitable width and preferably is about 0.5 to about 2.5 mm in width, more preferably about 0.75 to about 1.25 mm in width.

Extending inwardly from the innermost border of the limbal ring toward the geometric center of the lens are substantially triangular-shaped structures that resemble spokes in a wheel. The tapered spokes may, but preferably do not, extend over the entire iris portion of the lens, meaning the portion of the lens that overlies the iris when the lens is on-eye and centered. Rather, preferably the spokes extend inwardly from the innermost edge of the limbal ring so that the innermost edge of the spoke pattern is located at about 6 mm or more, more preferably about 7 mm or more from the geometric center of the lens. The spokes may be of uniform or varying shapes and sizes and preferably are about 1 to about 2 mm in length.

Figure 6:
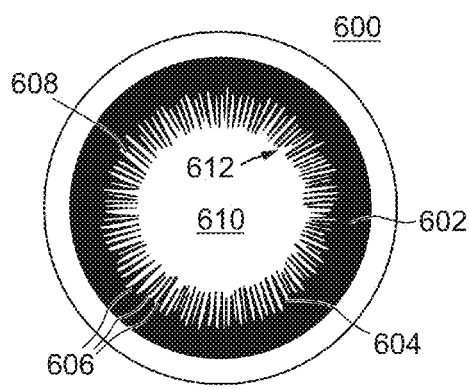
FIG. 6 is a plan view of a first exemplary limbal ring/spoke pattern cosmetic contact lens.

In FIG. 6, there is illustrated a first exemplary embodiment of the limbal ring-tapered spoke pattern on a contact lens 600. In this exemplary embodiment, the limbal ring 602 is a black opaque band that is approximately 1 mm in width. Beginning at the innermost border 604 of the limbal ring 602 and extending inwardly towards the geometric center of the contact lens 600 are a plurality of randomly arranged tapered spokes 606, the innermost border 612 of which forms a circle with a diameter of 7 mm as measured from the geometric center of the contact lens 600. Although all of the spokes 606 are generally similarly configured, preferably no one of the spokes 606 is exactly the same as another of the spokes 606. The spokes 606 are interspersed, or bordered, by spaces 608 in which spaces there are no elements. Spaces 608 are also generally all similarly configured, but preferably no one of the spaces 608 is of the exact same configuration as any of the other of the spaces 608 or spokes 606. Area 610 is a region in which there are no pattern elements, which area as shown will partially compose the iris portion of the wearer's eye as well as the whole of the pupil portion of the wearer's eye, or portion of the lens that overlies the wearer's pupil while the lens is on-eye and centered. As shown, area 610 is clear, but it may be translucently or opaquely colored as well. Innermost border 604 as shown is of an even, regular shape, but may be an uneven, irregular border. Similarly, although tapered spoke border 612 forms a substantially even border, it may form an uneven border.

Figure 7:
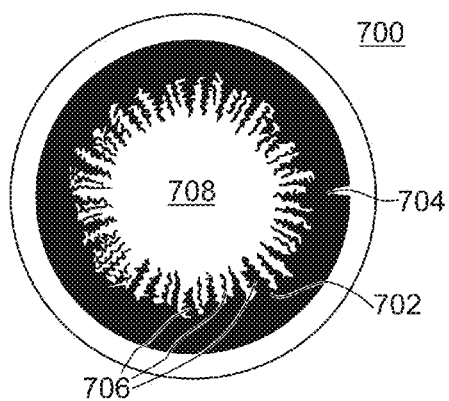
FIG. 7 is a plan view of a second exemplary limbal ring/spoke pattern cosmetic contact lens.

FIG. 7 illustrates an alternate tapered spoke pattern on a contact lens 700. In this exemplary embodiment, beginning at the innermost border 702 of the limbal ring 704 and extending inwardly towards the geometric center of the contact lens 700 is a plurality of randomly arranged tapered spokes 706. In this exemplary embodiment, tapered spokes 706 comprise one or more wavy lines that taper as one moves toward the geometric center of the contact lens 700. The innermost limbal ring border 702, as illustrated, is of an uneven, irregular shape. Area 708 is a region in which there are no pattern elements, which area will partially compose the iris portion of the wearer's as well as the whole of the pupil portion of the wearer's eye as described above.

Figure 8:
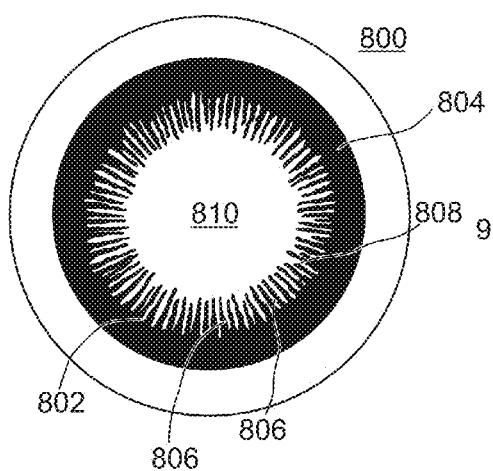
FIG. 8 is a plan view of a third exemplary limbal ring/spoke pattern cosmetic contact lens.

FIG. 8 illustrates yet another tapered spoke pattern on a contact lens 800. In this exemplary embodiment, beginning at the innermost border 802 of the limbal ring 804 and extending inwardly to the geometric center of the contact lens 800 are a plurality of spokes 806 and 808, with spokes 806 being longer than spokes 808 and both of which spokes 806, 808 are formed by wavy lines. As shown, spokes 806 and 808 are spaced at substantially regular intervals from one another, but may be irregularly spaced as well. Additionally, each of the spokes 806 are all of the substantially same shape, but they may be of differing shapes as may be the case for spokes 808. Area 810 is a region in which there are no pattern elements, which area will partially compose the iris portion of the wearer's eye as well as the whole of the wearer's pupil as described above.

Figure 9:
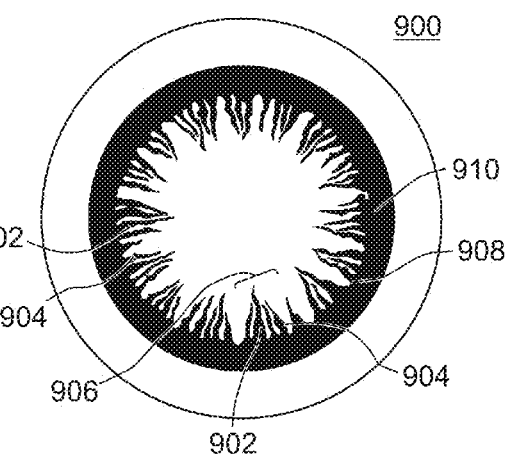
FIG. 9 is a plan view of a fourth exemplary limbal ring/spoke pattern cosmetic contact lens.

FIG. 9 illustrates still another exemplary tapered spoke pattern on a contact lens 900, which is a variation of the pattern illustrated in FIG. 8. In this exemplary embodiment, the spoke pattern has multiple spokes 902 and 904, with spokes 902 being longer than spokes 904, and both of which spokes 902, 904 are formed by wavy lines. As shown, spokes 902 and 904 are randomly grouped together to form clusters 906. These clusters 906 extend from the inner most radius 908 of limbal ring 910.

Figure 10:
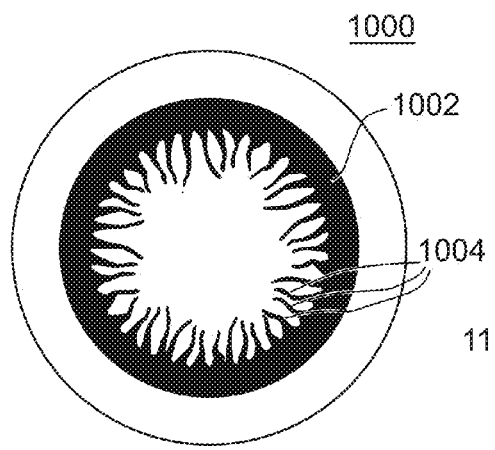
FIG. 10 is a plan view of a fifth exemplary limbal ring/spoke pattern cosmetic contact lens.

FIG. 10 illustrates an exemplary tapered spoke pattern on a contact lens 1000 in which there is a limbal ring 1002 and extending inwardly therefrom are a plurality of randomly spaced spokes 1004. In this exemplary embodiment, the spokes 1004 are bent at one or more locations.

In all of the patterns described with respect to FIGS. 6-10, the spokes may extend inwardly to the geometric center of the lens. Preferably, however, the innermost border of the spokes, or edge relative to the geometric center of the lens, is located at about 6.5 mm or greater, preferably about 7 mm or greater from the geometric center of the lens.

Figure 11:
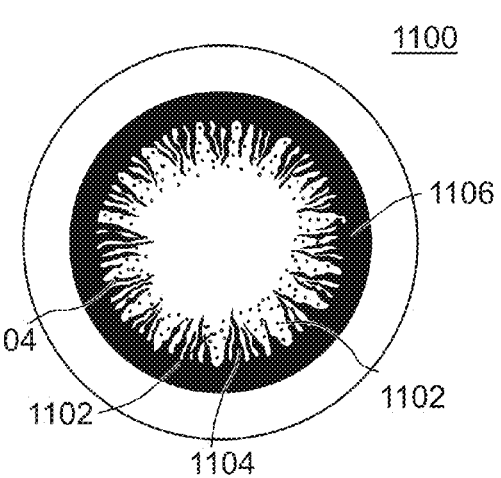
FIG. 11 is a plan view of a sixth exemplary limbal ring/spoke pattern cosmetic contact lens.

In addition to the spokes and limbal ring elements, the patterns may include any of a number of additional components. Such components may include geometric structures, such as dots and lines, or fanciful structures, including striae, feather-like shapes, and the like, and combinations thereof. In one exemplary embodiment, as illustrated in FIG. 11, a contact lens 1100 may comprise a plurality of random dots 1102 that overlay the spokes 1104 and the spaces between spokes 1104. Alternatively, the plurality of dots may overlay only a portion of the area of the spokes and spaces therebetween, such as overlaying only their innermost portions or portions closest to the limbal ring 1106 or about one (1) to about ninety (90) percent, preferably about twenty-five (25) to seventy-five (75) percent, of that area. As yet another alternative, the random dot pattern may be such that, as one moves inwardly toward the lens' geometric center, the dots become less numerous forming a dot density gradient. The dots aid in blending of the border between limbal ring 1106 and the spokes 1104.

Figure 12:
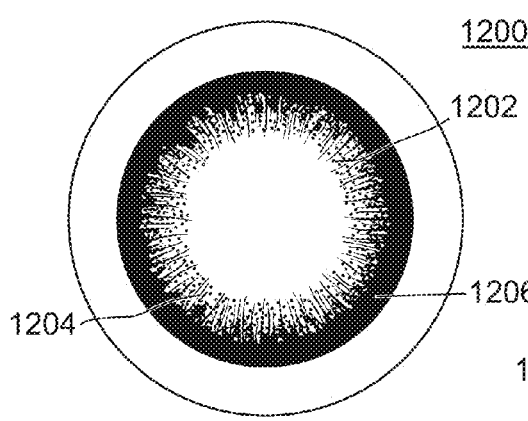
FIG. 12 is a plan view of a seventh exemplary limbal ring/spoke pattern cosmetic contact lens.

As yet another alternative, in FIG. 12, there is illustrated a contact lens 1200 having a plurality of random dots 1202, overlaying spokes 1204 and the spaces between spokes. The dots 1202 overlay the entirety of spokes 1204 and the spaces therebetween. The spokes extend from the limbal ring 1206. The dots used in the patterns of the invention may be of any size and preferably are about 0.060 to about 0.180 mm in diameter, more preferably about 0.0075 to about 0.0125 mm in diameter.

In any of the patterns of the cosmetic contact lenses set forth herein, the center preferably is clear to ensure no impact on visual acuity. However, the center region may be an area of translucent/transparent or opaque color or any combination of opaque and translucent/transparent colors.

As used in a contact lens for either enhancing or altering the wearer's eye color, preferably the limbal ring element is a solid band of color that masks the color of the lens wearer's limbal region and more preferably, the masking color is an opaque color. Once again, limbal rings, sized appropriately, may be utilized to create a halo effect. The remaining elements, the spokes, dots and other pattern elements may be translucent or opaque depending on the desired cosmetic on-eye result. For purposes of the invention, by "translucent" is meant a color that permits an average light transmittance (% T) in the 380 to 780 nm range of about 60 to about 99%, preferably about 65 to about 85% T. By "opaque" is meant a color that permits an average light transmittance (% T) in the 380 to 780 nm range of 0 to about 55, preferably 7 to about 50% T.

The color selected for each of the limbal ring and iris pattern elements will be determined by the natural color of the lens wearer's iris and the enhancement or color change desired. Thus, elements may be any color, including any of a variety of hues and chromas of blue, green, gray, brown, black, yellow, red, or combinations thereof. Preferred colors for the limbal ring include any of the various hues and chromas of black, brown, gray, dark blue and dark green.

Figure 13:
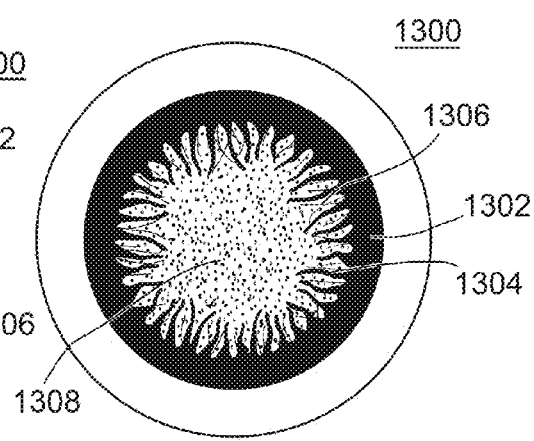
FIG. 13 is a plan view of an eighth exemplary limbal ring/spoke pattern cosmetic contact lens.

The color of the limbal ring, spokes and other pattern elements may also be substantially the same as, or complementary to, each other. For example, in FIG. 13 there is illustrated a contact lens 1300 comprising a pattern in which a limbal ring 1302 and spokes 1304 are of the same color. Spokes 1306 are of a different, but complementary color to that of limbal ring 1302 and spokes 1304. Pupil portion 1308 is of yet another color complementary to the limbal ring and spoke colors. Preferably, the pupil portion is clear, meaning that it is colorless.

The brightly colored element comprising the peripheral portion may be pure white, near white, off white, light yellow, pale blue, light pink, light green, or any combination of the above. Preferably, it is matched so that it does not starkly contrast with the visible portion of the sclera that is not covered by the lens. These colors are preferably obtained by use of $TiO_2$ with higher amounts yielding greater opacity and contrast. The addition of pigments include iron oxide black, iron oxide brown, iron oxide yellow, iron oxide red, titanium dioxide, and the like, and combinations thereof, in small amounts to adjust the whiter colored element. In addition to these pigments, soluble and non-soluble dyes may be used, including dichlorotriazine and vinyl sulfone-based dyes. One exemplary embodiment being a colorant with 10 percent to 20 percent $TiO_2$ and 80 percent to 90 percent clear binding polymer to provide appropriate translucency.

In general, the colored elements may be made from any organic or inorganic pigment suitable for use in contact lenses, or combinations of such pigments. The opacity may be controlled by varying the concentration of the pigment and titanium dioxide used, with higher amounts yielding greater opacity. Illustrative organic pigments include phthalocyanine blue, phthalocyanine green, carbazole violet, vat orange #1, and the like as well as combinations thereof. Examples of useful inorganic pigments include iron oxide black, iron oxide brown, iron oxide yellow, iron oxide red, titanium dioxide, and the like, as well as combinations thereof. In addition to these pigments, soluble and non-soluble dyes may be used, including dichlorotriazine and vinyl sulfone-based dyes. Useful dyes and pigments are commercially available.

In accordance with the present invention, a contact lens comprising a multi-layer design may be utilized to enhance the appearance of the eyes upon which the contact lenses are positioned while maintaining a natural look. The exemplary designs each comprise three layers; namely, a unique limbal design graphic, a unique inner effect graphic and a unique outer effect graphic. The order and color of printing the various layers has an impact on the final design as set forth in more detail below. In addition, each of the three layers may vary in color and design to create a unique appearance on eye.

The layers may be formed utilizing any number of design elements and design principles. For example, lines may be utilized to define shapes and create contours that imitate or mimic line structures, shapes and contours found in a natural iris. Color and hue values with varying levels of translucency and opacity may be utilized to create blending and contrast while varying color and hues may be utilized to imply depth by forming highlight and shadow. Space may be utilized to determine composition, for example, positive space may be utilized to define and imply effects while negative space may be utilized to allow the natural iris to contribute to the effect of the overall pattern. Perspective in overlapping layers may be utilized to imply and demonstrate depth within a given pattern. Texture created through contrasting colors and shapes may be utilized to create variation in the iris. As used in two dimensional art, texture is created by the use of light and dark. Light and dark elements may also be utilized to imply depth and form.

As set forth above, the present invention utilizes three distinct layers to provide more depth and variation in the overall pattern. The limbal design graphic is the portion of the overall pattern that surrounds the outer diameter of the iris and is closest to the sclera and is meant to highlight, enhance and/or define the limbal region of the eye; however, it also comprises elements that extend into the iris. The inner effect graphic layer is the portion of the overall pattern that is meant to enhance the iris; however, it may comprise a portion that also contributes to highlighting, enhancing and/or defining the limbal region of the eye. The outer effect graphic layer is the portion of the overall pattern that is meant to enhance the iris; however, it may comprise a portion that also contributes to highlighting, enhancing and/or defining the limbal region of the eye. The multiple layer approach of the present invention may be utilized to create varying levels of transparency and/or opacity utilizing overlapping and non-overlapping translucent layers.

Various design elements, as explained above, may be utilized to achieve various effects. As with the limbal ring/tapered spoke patterns described above, the multi-layered design in accordance with the present invention may also use similar features. For example, spokes, fingers, hair-like structures, as well similar structures and/or dots may be utilized to blend a solid limbal band into the iris. In addition, various other geometric shapes, including those that are found in a natural iris may be incorporated into the various layers.

Figure 14A:
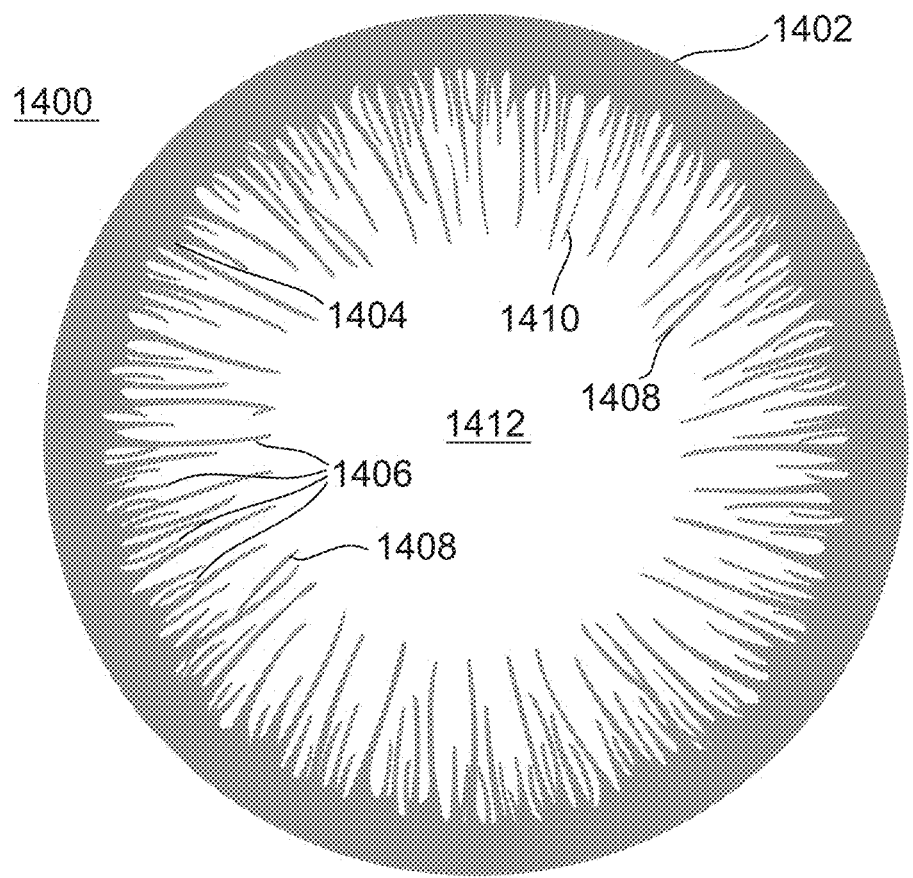
FIG. 14A is a plan view of a first exemplary limbal design graphic in accordance with the present invention.

Referring to FIG. 14A, there is illustrated a first exemplary embodiment of a limbal design graphic 1400 in accordance with the present invention. In this exemplary embodiment, the limbal design graphic 1400 comprises a translucent annular band 1402 that is approximately 0.89 mm in width. Connected to and extending from the innermost border 1404 of the annular band 1402 towards the geometric center of the limbal design graphic 1400 are plurality long, medium and short hair-like structures 1406. Some of the hair-like structures have branches 1408 off of the main structure 1406. Additional hair-like structures 1410 which are not connected to the translucent band 1402 are interspersed between the other hair-like structures 1406. These hair-like structures are designed to look like naturally occurring structures within the iris, for example, pupillary muscle structures, folds or radial furrows, crypts, ciliary structures and the like. The translucent annular band 1402 is designed to overlie and enhance the wearer's limbal region while the protruding structures 1406, 1408 and 1410, which are also translucent, are designed to enhance the wearer's iris and blend the translucent annular band 1402 in with the wearer's iris. The space between the hair-like structures creates shapes depending on overlapping and underlying elements, including pigmented shapes and features as well as exposed iris. The central portion 1412 of the design graphic 1400 may be clear as this portion of the design corresponds to the pupil. It is important to note; however, that tints may be utilized in this central portion 1412. In addition, the space between the elements of the design may be clear or tinted.

In this exemplary embodiment, the entire limbal design graphic 1400 is a translucent medium brown formed from a composition comprising red iron oxide, titanium dioxide, trans-oxide yellow, yellow iron oxide, brown iron oxide, and black iron oxide pigments in proportions to create a color in the brown to black family. It is important to note that while the limbal design graphic 1400 is translucent in this exemplary embodiment, other designs may comprise opaque elements or a combination of opaque and translucent elements. This limbal design graphic 1400 is printed utilizing the techniques described in detail subsequently and it is printed first. In other words, it is the first graphic layer of the overall design that is to be incorporated into the lens. The order of printing affects the overall design as described in greater detail subsequently.

Figure 14B:
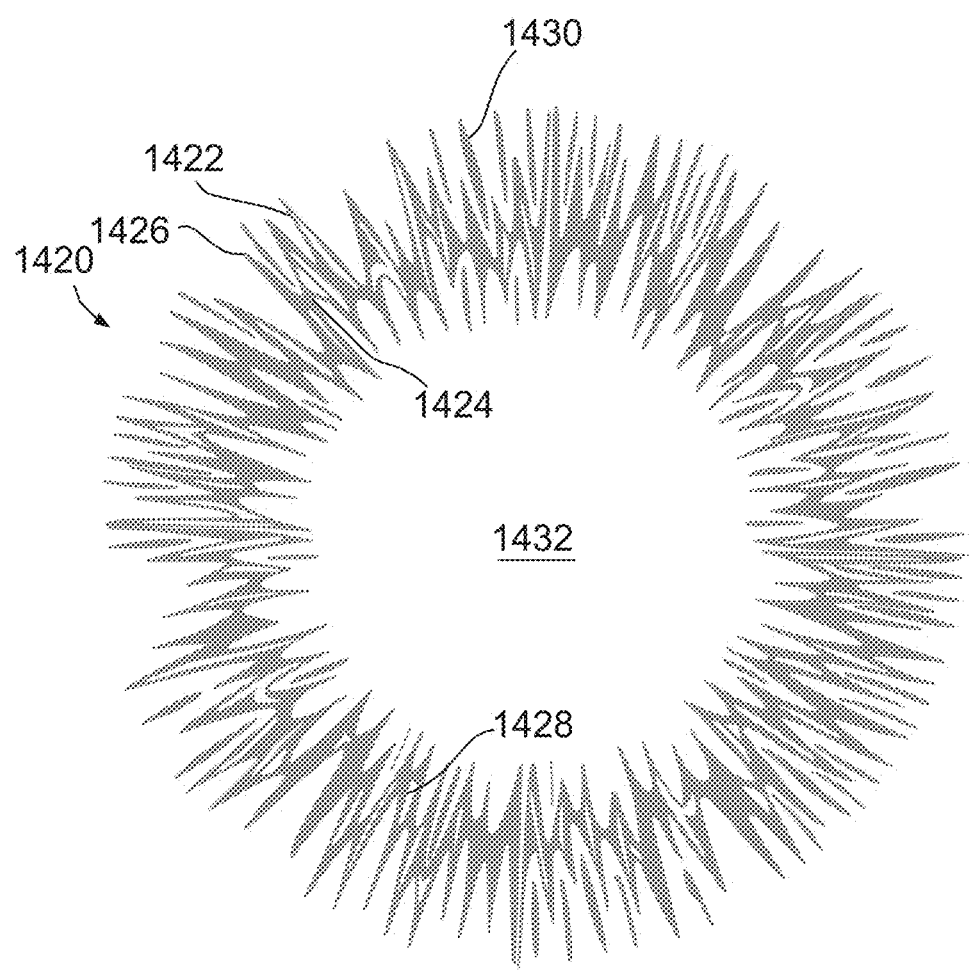
FIG. 14B is a plan view of a first exemplary inner effect design graphic in accordance with the present invention.

FIG. 14B illustrates a first exemplary embodiment of an inner effect design graphic 1420 in accordance with the present invention. The inner effect graphic 1420 comprises an annular band including a wave-like ring structure 1422 with geometric shapes having a plurality of rounded troughs 1424 and pointed peaks 1426 with various shaped elements of negative space 1428 (the negative space exists as closed features within printed elements and open shapes outside of printed elements) therein, i.e. no pattern, and a plurality of elongated, substantially elliptical structures 1430 of varying length and width interspersed in the troughs 1424. The substantially elliptical structures 1430 may or may not have tapered end points. The overall effect may resemble a sinusoidal pattern or mimic a natural iris. More specifically, the overall effect is designed to look like naturally occurring structures within the iris, for example, pupillary muscle structures, folds or radial furrows, crypts, ciliary structures and the like. The inner effect design graphic 1420 is designed to overlie and enhance the wearer's iris and at least partially overlaps with the translucent annular band 1402 of the limbal design graphic 1400. In addition, the inner effect design graphic 1420 overlies the protruding structures 1406, 1408, and 1410 of the limbal design graphic 1400 in such a way as to have overlapping translucent sections as well as filling in some or a portion of the negative space between the protruding structures 1406, 1408, and 1410. The sections of overlapping translucent pigment create additional hues within the pattern that may be darker or lighter depending on the colors utilized in the underlying individual structures as well as differing levels of translucency. The space between the elements of the pattern creates shapes, depending on overlapping and underlying elements, including pigmented shapes and features as well as exposed iris. The central portion 1432 of the design graphic 1420 may be clear as this portion of the design corresponds to the pupil. It is important to note; however, that tints may be utilized in this region. In addition, the negative space may be clear or tinted.

In this exemplary embodiment, the entire inner effect design graphic 1420 is a translucent orange formed from a composition comprising red iron oxide, trans-oxide yellow, brown iron oxide, and trans-oxide red pigments in proportions to create a color in the orange family. The orange family includes yellows and golds. These colors or colors in this family are meant to highlight the underlying natural iris color for individuals with eyes that are of a darker hue, for example, browns, dark browns, dark hazels and the like. Different colors would be utilized for individuals with eyes of a lighter hue, for example, blues, greens, light hazels, greys and the like. It is important to note that while the inner effect graphic 1420 comprises translucent elements, in other embodiments, it may comprise opaque elements and/or a combination of translucent and opaque elements. This inner effect graphic 1420 is printed utilizing the techniques described in detail subsequently and is printed second after the limbal graphic 1400. In other words, the inner effect graphic 1420 is printed after and on top of the limbal design graphic 1400. This printing order is from a manufacturing standpoint. From an observer's perspective, this layer, the inner effect design graphic 1420, would appear behind the graphic 1400. The outer diameter of the inner effect design graphic 1420 is less than the outer diameter of the limbal design graphic 1400 while the inner diameters are substantially equal.

Figure 14C:
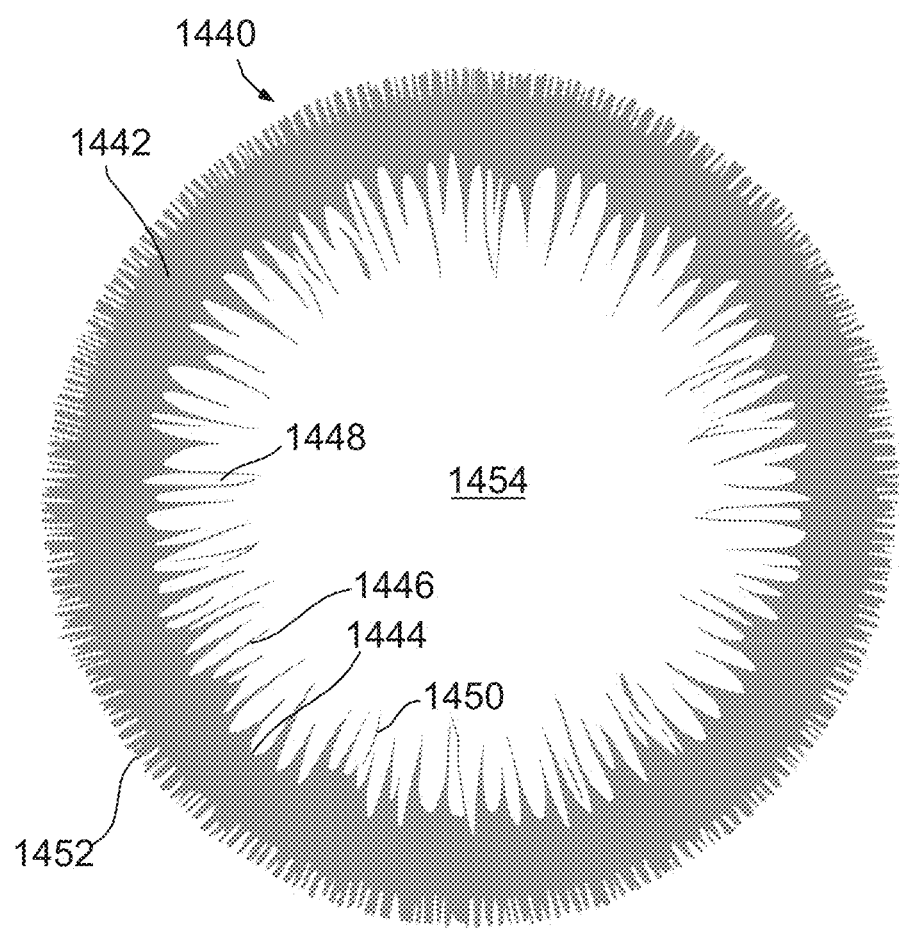
FIG. 14C is a plan view of a first exemplary outer effect design graphic in accordance with the present invention.

FIG. 14C illustrates a first exemplary embodiment of an outer effect design graphic 1440 in accordance with the present invention. In this exemplary embodiment, the outer effect design graphic 1440 comprises a translucent annular band 1442 that is approximately 1.44 mm in width. Connected to and extending from the innermost border 1444 of the translucent annular band 1442 is a plurality of long, medium, and short substantially triangular shaped structures 1446. Some of the substantially triangular shaped structures touch one another at the apex to form an enclosed space 1448. The outer effect design graphic 1440 also comprises a plurality of lines 1450 which are not connected to the translucent annular band 1442 and are interspersed between the substantially triangular shaped structures and oriented in the same direction; namely, towards the geometric center of the outer effect design graphic 1440. These structures are designed to look like naturally occurring structures within the iris, for example, pupillary muscle structures, folds or radial furrows, crypts, ciliary structures and the like. The outer perimeter of the translucent annular band 1442 comprises comb-like structure 1452 which alters the appearance of the annular band 1442 to a less defined structure. The comb-like structure 1452 is intended to soften and blend the overlapping line created by overlapping translucent colors from the three layers; namely, the limbal design graphic 1400, the inner effect design graphic 1420 and the outer effect design graphic 1440. The outer effect design graphic 1440 is designed to overlie and enhance the translucent annular band 1402 of the limbal design graphic 1400 as well as the entire inner effect design graphic 1420 and the protruding structures 1406, 1408, and 1410 of the limbal design graphic 1400. The outer layer design graphic 1440 fills in more negative space and the overlapping sections or positive space create areas of additional hues, areas of different levels of opacity and different designs separate and distinct from any single layer or graphic. In addition, the negative space left between the overlapping areas creates shapes and patterns that assist in blending and cosmetic effect by working in conjunction with the natural iris. The negative space between the elements of the design creates shapes, depending on overlapping and underlying elements, including pigmented shapes and features as well as exposed iris. The central portion 1454 may be clear as this portion of the lens corresponds to the pupil. It is important to note; however, that tints may be utilized in this section. In addition, the negative space between the elements may be tinted. The comb-like structure 1452 alters the outer diameter of the annular band 1402 of the limbal design graphic by creating a shape that disrupts the hard line of the transparent limbal design graphic 1400.

In this exemplary embodiment, the entire outer effect design graphic 1440 is a translucent black formed from a composition comprising brown iron oxide and black iron oxide pigments. In this exemplary embodiment, where the outer effect design graphic 1440 and the limbal design graphic 1400 overlap, they create a darker, more defined/opaque area, while the portions of the designs that do not overlap leave a more translucent coloring providing translucent blending from opaque to clear. This technique allows for blending with the natural iris. The outer effect design graphic 1440 comprises a translucent design in this exemplary embodiment; however, in other embodiments, the design may comprise opaque elements and/or a combination of translucent and opaque elements. The outer effect graphic 1440 is printed utilizing the techniques described in detail subsequently and is printed third in order after and on top of the inner effect graphic layer 1420. This printing order is from the manufacturing standpoint. From an observer's perspective, this layer would appear behind the inner effect design graphic 1420. The outer diameter of the outer effect graphic 1440 is less than the outer diameter of the limbal design graphic 1400 while the inner diameters are substantially equal.

Figure 14D:
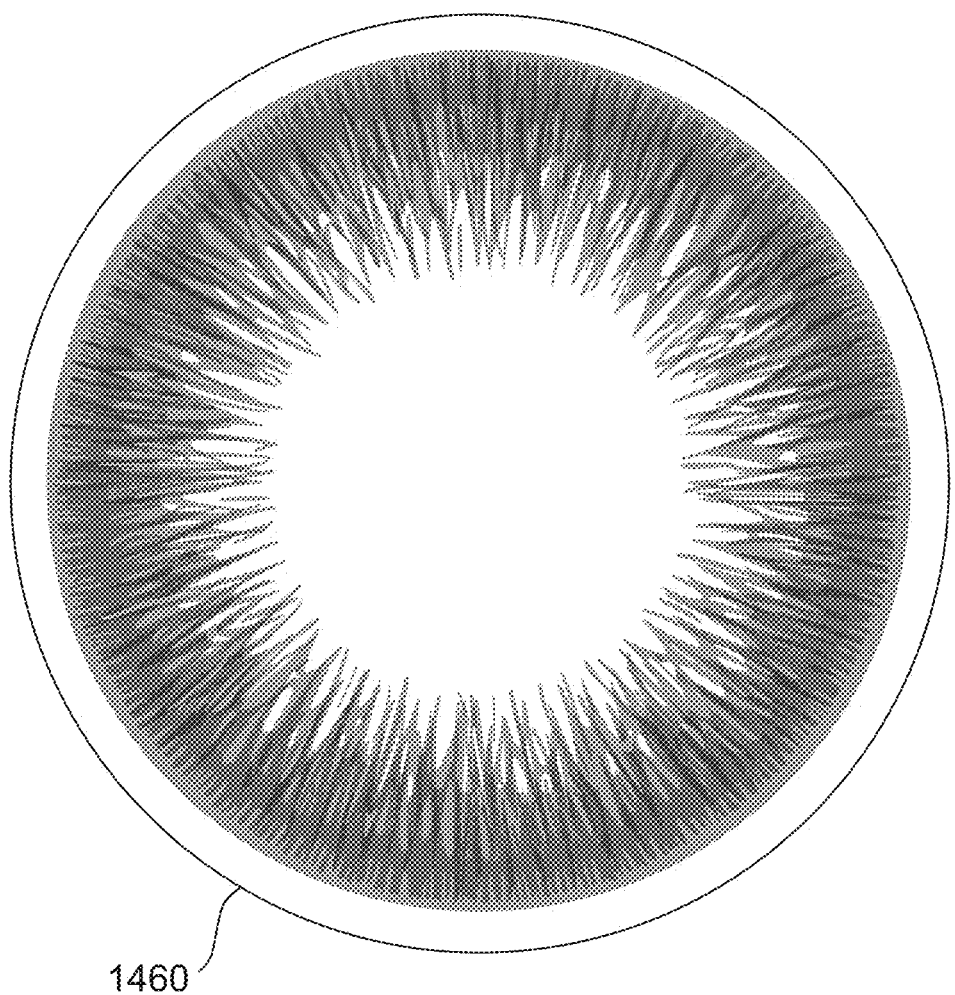
FIG. 14D is a plan view of a first exemplary cosmetic contact lens comprising the three design graphics of FIGS. 14A, B and C in accordance with the present invention.

FIG. 14D illustrates a first exemplary embodiment of a cosmetic contact lens 1460 comprising all three layers or design graphics 1400, 1420 and 1440 printed in the order described above. While the printing order is described from a manufacturing perspective, when an observer is viewing the contact lens on eye, the visual effect is that of seeing the layers or design graphics in a reverse order from that described in printing. As shown, the overlapping layers comprise different colors, different levels of translucency, different hues, different levels of lightness, different levels of darkness and patterns forming a unique structure. Changes in either both the printing order or colors will result in a different design as set forth in detail subsequently. In addition, changing the level of translucency may also affect the overall design with regard to hue, blending, texture and contrast.

The overall design created by the three layers comprises an annular structure with an inner diameter of about 6.5 mm and an outer diameter in the range from about 12.675 mm to about 12.8 mm. The annular structure is similar to the iris structure of the eye by design. The open or negative space in the center of the lens corresponds to the pupillary region or optical zone of the eye and is preferably clear so as not to interfere with vision. However, as set forth above, this region may be tinted as well as any negative space.

Figure 15A:
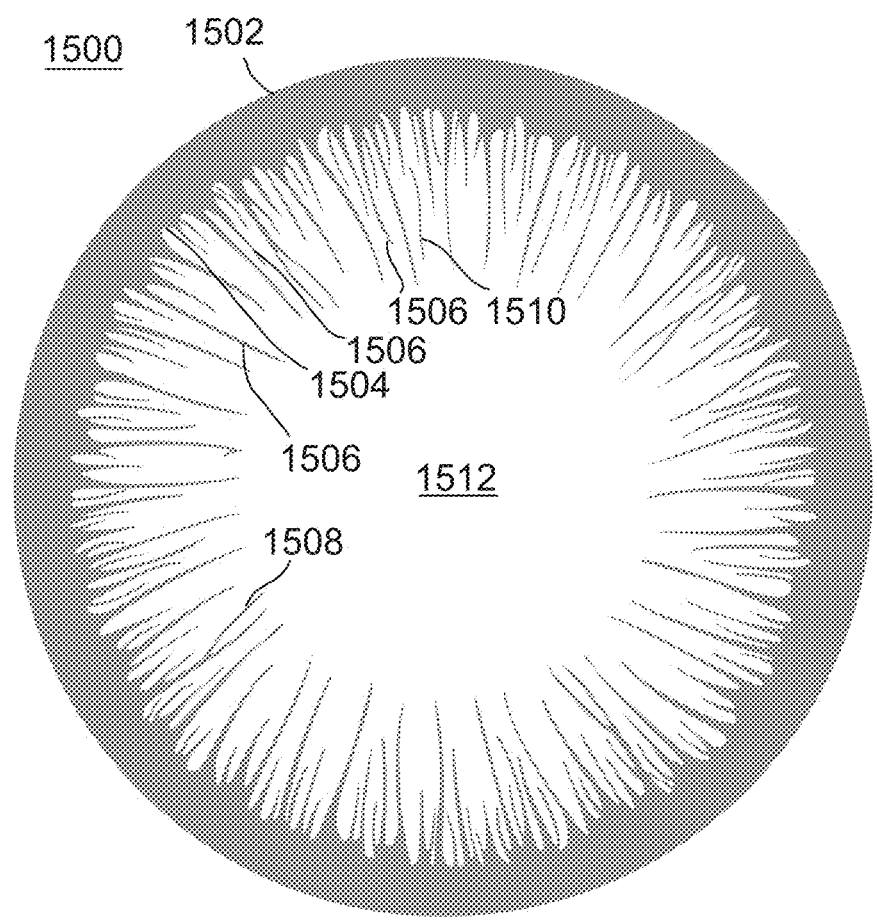
FIG. 15A is a plan view of a second exemplary limbal design graphic in accordance with the present invention.

Referring to FIG. 15A, there is illustrated a second exemplary embodiment of a limbal design graphic 1500 in accordance with the present invention. In this exemplary embodiment, the limbal design graphic 1500 comprises a translucent annular band 1502 that is approximately 0.89 mm in width. Connected to and extending from the innermost border 1504 of the translucent annular band 1502 towards the geometric center of the limbal design graphic 1500 are plurality long, medium and short hair-like structures 1506. Some of the hair-like structures have branches 1508 off of the main structure 1506. Additional hair-like structures 1510 which are not connected to the opaque band 1502 are interspersed between the other hair-like structures 1506. These hair-like structures are designed to look like naturally occurring structures within the iris, for example, pupillary muscle structures, folds or radial furrows, crypts, ciliary structures and the like. The translucent annular band 1502 is designed to overlie and enhance the wearer's limbal region while the protruding structures 1506, 1508 and 1510 are designed to enhance the wearer's iris and blend the annular band 1502 in with the iris. The protruding structures 1506, 1508 and 1510 are also translucent. The space between the hair-like structures creates shapes depending on overlapping and underlying elements, including pigmented shapes and features as well as exposed iris. The central portion 1512 of the design graphic 1500 may be clear as this portion of the design corresponds to the pupil. It is important to note; however, that tints may be utilized in this central portion 1512. In addition, the space between the elements of the design may be clear or tinted.

In this exemplary embodiment, the entire limbal design graphic 1500 is a translucent black formed from black iron oxide pigments. It is important to note that while the limbal design graphic 1500 is translucent in this exemplary embodiment, other designs may comprise opaque elements or a combination of opaque and translucent elements. The limbal design graphic 1500 is printed utilizing the techniques described in detail subsequently and it is printed first. In other words, it is the first graphic layer of the overall design that is to be incorporated into the lens. The order of printing affects the overall design as described in greater detail subsequently.

Figure 15B:
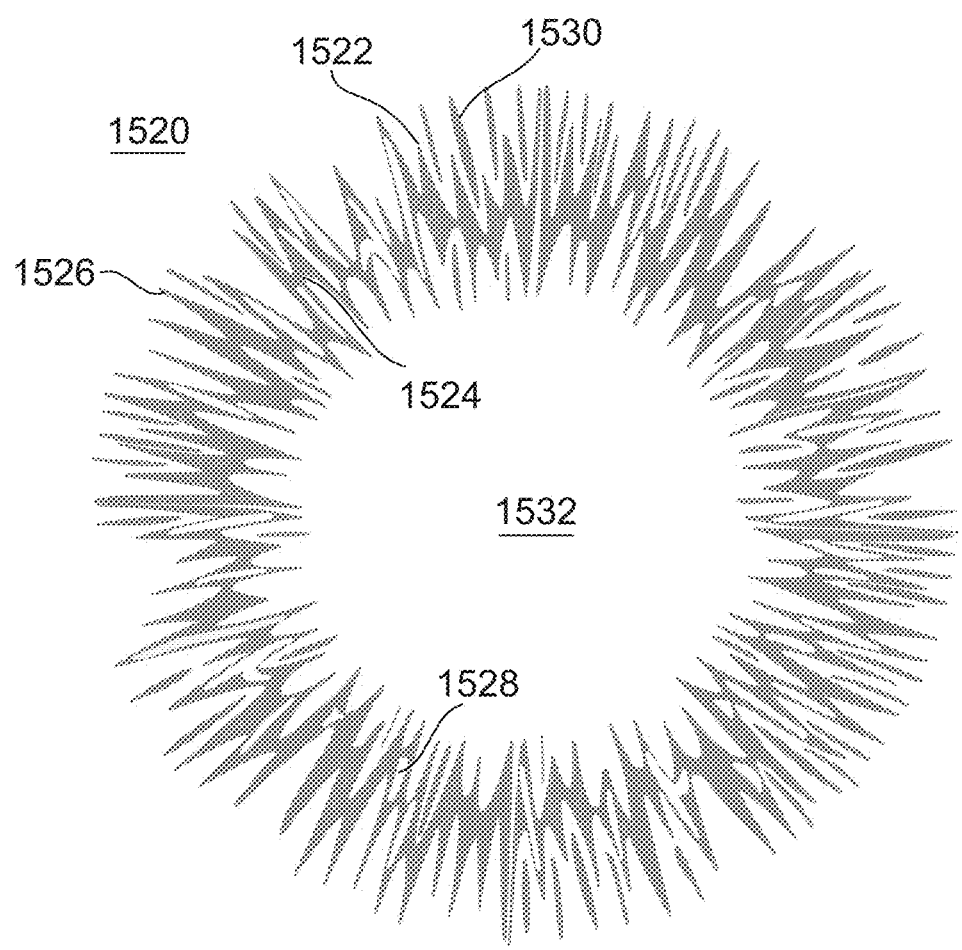
FIG. 15B is a plan view of a second exemplary inner effect design graphic in accordance with the present invention.

FIG. 15B illustrates a second exemplary embodiment of an inner effect design graphic 1520 in accordance with the present invention. The inner effect graphic 1520 comprises an annular band including a wave-like ring structure 1522 with geometric shapes having a plurality of rounded troughs 1524 and pointed peaks 1526 with various shaped elements of negative space 1528 (the negative space exists as closed features within printed elements and open shapes outside of printed elements) therein, i.e. no pattern, and a plurality of elongated, substantially elliptical structures 1530 of varying length and width interspersed in the troughs 1524. The substantially elliptical structures 1530 may or may not have tapered end points. The overall effect may resemble a radial pattern or mimic a natural iris. More specifically, the overall effect is designed to look like naturally occurring structures within the iris, for example, pupillary muscle structures, folds or radial furrows, crypts, ciliary structures and the like. The inner effect design graphic 1520 is designed to overlie and enhance the wearer's iris and at least partially overlaps with the translucent annular band 1502 of the limbal design graphic 1500. In addition, the inner effect design graphic 1520 overlies the protruding structures 1506, 1508, and 1510 of the limbal design graphic 1500 in such a way as to have overlapping translucent sections as well as filling in some or a portion of the negative space between the protruding structures 1506, 1508, and 1510. The sections of overlapping translucent pigment create additional hues within the pattern that may be darker or lighter depending on the colors utilized in the underlying individual structures as well as differing levels of translucency. The space between the elements of the pattern creates shapes, depending on overlapping and underlying elements, including pigmented shapes and features as well as exposed iris. The central portion 1532 of the design graphic 1520 may be clear as this portion of the design corresponds to the pupil. It is important to note; however, that tints may be utilized in this region. In addition, the negative space between the elements of the design may be clear or tinted.

In this exemplary embodiment, the entire inner effect design graphic 1520 is a translucent medium brown formed from a composition comprising red iron oxide, titanium dioxide, trans-oxide yellow, yellow iron oxide, brown iron oxide and black iron oxide pigments in proportions to create a color in the gold to brown family. The colors utilized are meant to highlight or otherwise enhance the underlying natural iris color. Different colors are utilized for different color eyes. The inner effect design graphic 1520 may comprise opaque and/or a combination of opaque and translucent elements in alternate exemplary embodiments. The inner effect design graphic 1520 is printed utilizing the techniques described in detail subsequently and is printed second after the limbal graphic 1500. In other words, the inner effect graphic 1520 is printed after and on top of the limbal design graphic 1500. This printing order is from a manufacturing standpoint. From an observer's perspective, this graphic layer 1520 would appear behind the limbal design graphic 1500. The outer diameter of the inner effect design graphic 1520 is less than the outer diameter of the limbal design graphic 1500 while the inner diameters are substantially equal.

Figure 15C:
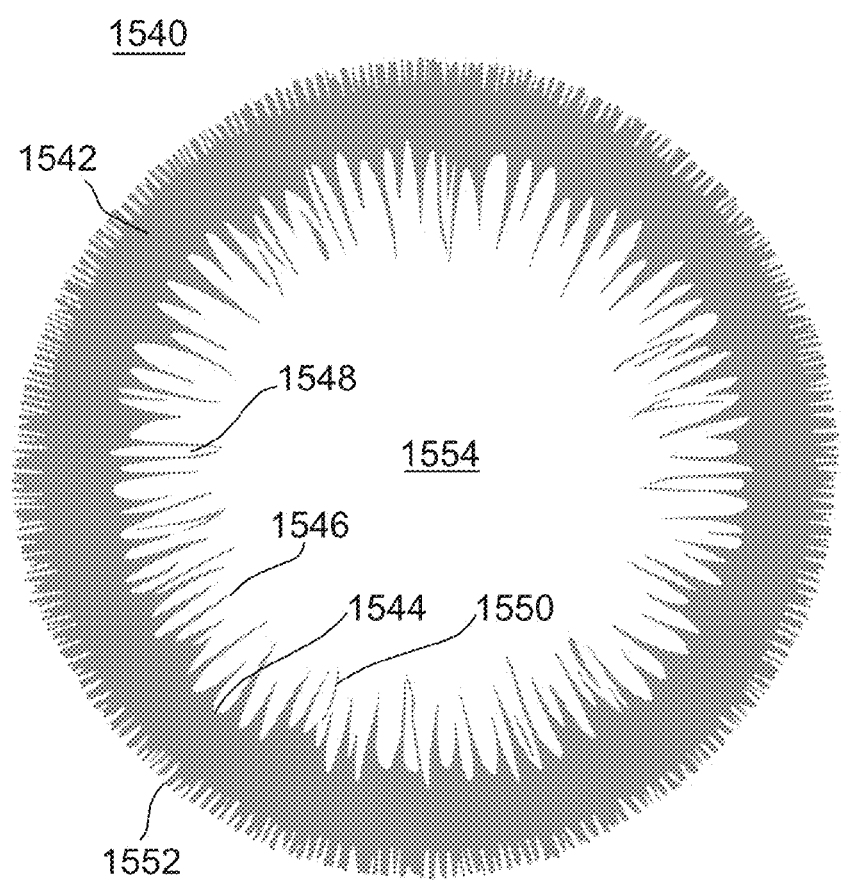
FIG. 15C is a plan view of a second exemplary outer effect design graphic in accordance with the present invention.

FIG. 15C illustrates a second exemplary embodiment of an outer effect design graphic 1540 in accordance with the present invention. In this exemplary embodiment, the outer effect design graphic 1540 comprises a translucent annular band 1542 that is approximately 1.44 mm in width. Connected to and extending from the innermost border 1544 of the translucent annular band 1542 is a plurality of long, medium, and short substantially triangular shaped structures 1546. Some of the substantially triangular shaped structures touch one another at the apex to form an enclosed space 1548. The outer layer design graphic 1540 also comprises a plurality of lines 1550 which are not connected to the opaque annular band 1542 and are interspersed between the substantially triangular shaped structures and oriented in the same direction; namely, towards the geometric center of the outer effect design graphic 1540. These structures are designed to look like naturally occurring structures within the iris, for example, pupillary muscle structures, folds or radial furrows, crypts, ciliary structures and the like. The outer perimeter of the translucent annular band 1542 comprises a comb-like structure 1552 which alters the appearance of the annular band 1542 to a less defined structure. The comb-like structure 1552 is intended to soften and blend the overlapping line created by overlapping translucent colors from the three layers; namely, the limbal design graphic 1500, the inner effect graphic 1520 and the outer effect design graphic 1540. The outer effect design graphic 1540 is designed to overlie and enhance the translucent annular band 1502 of the limbal design graphic 1500 as well as the entire inner effect design graphic 1520 and the protruding structures 1506, 1508, and 1510 of the limbal design graphic 1500. The outer effect design graphic 1540 fills in more negative space and the overlapping sections or positive space create areas of additional hues, areas of different levels of opacity and different designs separate and distinct from any single layer or graphic. In addition, the negative space left between the overlapping areas creates shapes and patterns that assist in blending and cosmetic effect by working in conjunction with the natural iris. The negative space between the elements of the design creates shapes, depending on overlapping and underlying elements, including pigmented shapes and features as well as exposed iris. The central portion 1554 may be clear as this portion of the lens corresponds to the pupil. It is important to note; however, that tints may be utilized in this section. In addition, the negative space between the elements may also be clear or tinted. The comb-like structure 1552 alters the appearance of the outer diameter of the annular band 1502 of the limbal design graphic by softening its appearance.

In this exemplary embodiment, the entire outer effect design graphic 1540 is a translucent gray formed from a composition comprising titanium dioxide and black iron oxide pigments. In this exemplary embodiment, where the outer effect design graphic 1540 and the limbal design graphic 1500 overlap, they create a darker, more defined/opaque area, while the portions of the designs that do not overlap leave a more translucent coloring providing translucent blending from opaque to clear. This technique allows for blending with the natural iris. The outer effect design graphic 1540 comprises a translucent design; however, other designs may incorporate opaque elements and/or a combination of opaque and translucent elements The outer effect graphic 1540 is printed utilizing the techniques described in detail subsequently and is printed third in order after and on top of the inner effect graphic 1520. This printing order is from the manufacturing standpoint. From an observer's perspective, this layer would appear behind the inner effect design graphic 1520. The outer diameter of the outer effect graphic 1554 is less than the outer diameter of the limbal design graphic 1500 while the inner diameters are substantially equal.

Figure 15D:
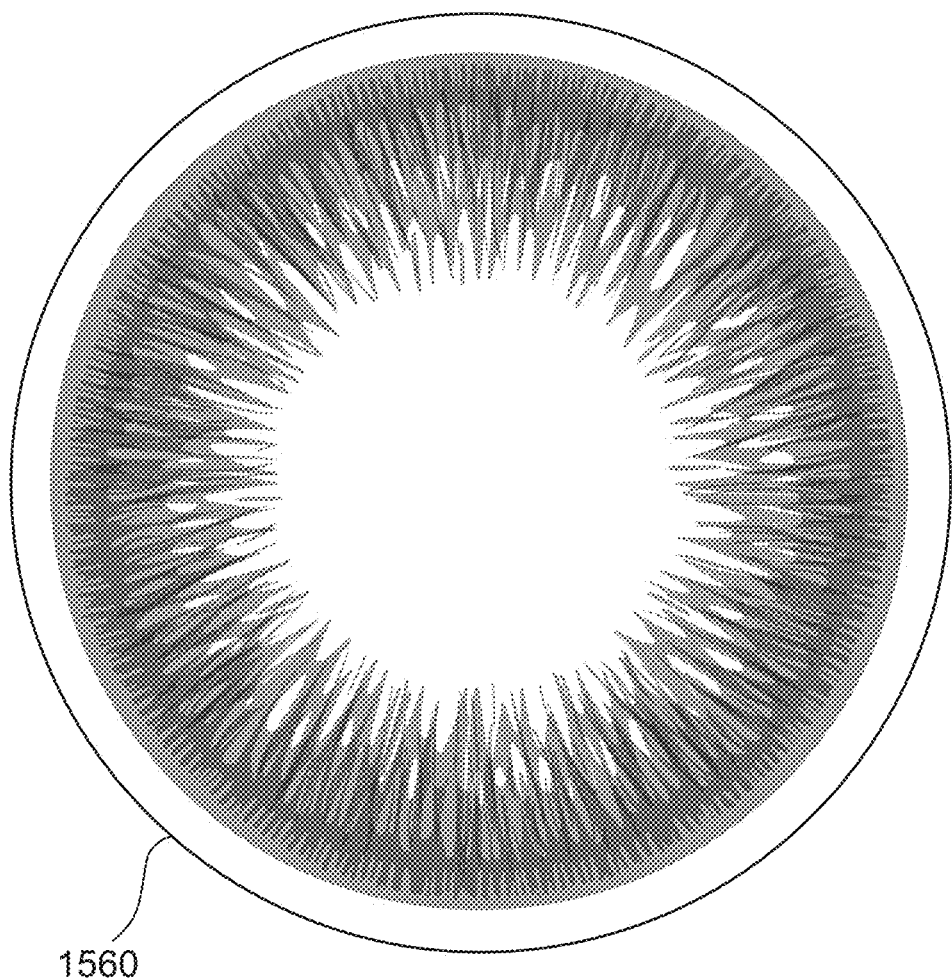
FIG. 15D is a plan view of a second exemplary cosmetic contact lens comprising the three design graphics of FIGS. 15A, B and C in accordance with the present invention.

FIG. 15D illustrates a second exemplary embodiment of a cosmetic contact lens 1560 comprising all three layers or design graphics 1500, 1520 and 1540 printed in the order described above. While the printing order is described from a manufacturing perspective, when an observer is viewing the contact lens on eye, the visual effect is that of seeing the layers or design graphics in a reverse order from that described in printing. As shown, the overlapping layers comprise different colors, different hues, different levels of lightness, different levels of darkness and patterns forming a unique structure. Changes in either both the printing order or colors will result in a different design. In addition, any of these changes may affect the level of translucency which may also affect the overall design.

Figure 16A:
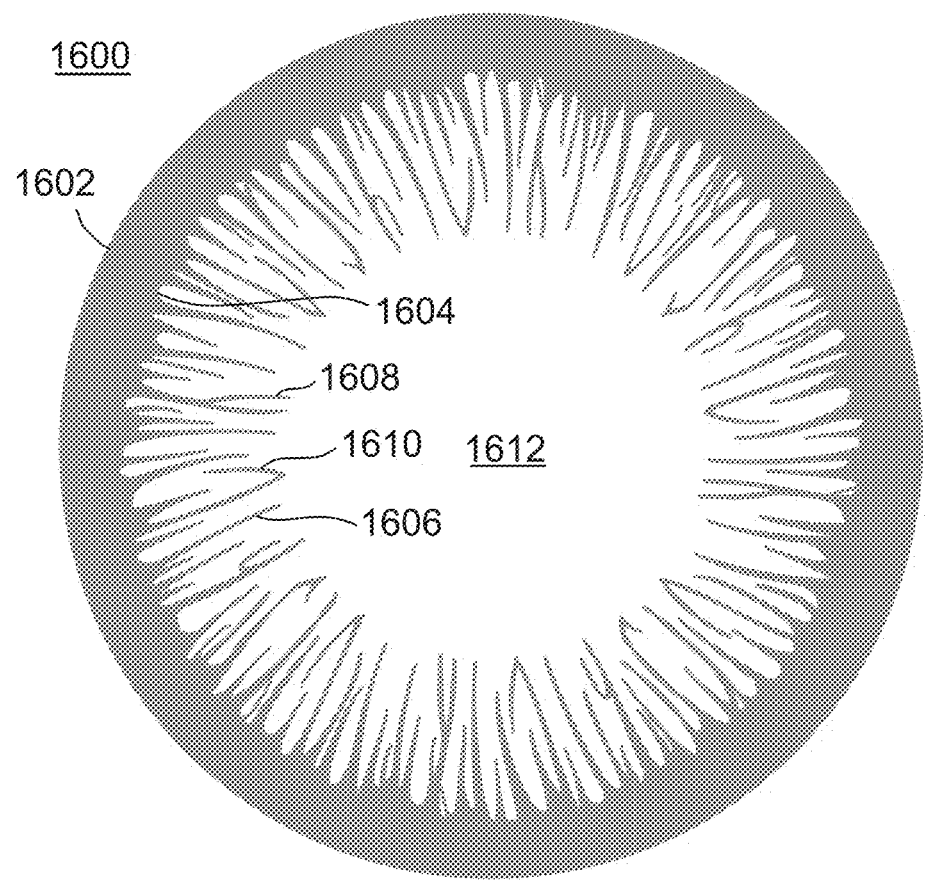
FIG. 16A is a plan view of a third exemplary limbal design graphic in accordance with the present invention.

The overall design created by the three layers comprises an annular structure with an inner diameter of about 6.0 mm and an outer diameter in the range from about 12.50 mm to about 12.775 mm. The annular structure is similar to the iris structure of the eye by design. The open or negative space in the center of the lens corresponds to the pupillary region or optical zone of the eye and is preferably clear so as not to interfere with vision. However, as set forth above, this region as well as any negative space may be tinted Referring to FIG. 16A, there is illustrated a third exemplary embodiment of a limbal design graphic 1600 in accordance with the present invention. In this exemplary embodiment, the limbal design graphic 1600 comprises a translucent annular band 1602 that is approximately 0.89 mm in width. Connected to and extending from the innermost border 1604 of the translucent annular band 1602 towards the geometric center of the limbal design graphic 1600 is a plurality of long, medium and short hair-like structures 1606. Some of the hair-like structures have branches 1608 off of the main structure 1606. Additional branch-like structures 1610 creating hook like structures are meant to mimic the edge of the pupillary muscle. As before, all of these structures are designed to look like naturally occurring structures within the iris, for example, pupillary muscle structures, folds or radial furrows, crypts, ciliary structures and the like. The translucent annular band 1602 is designed to overlie and enhance the wearer's limbal region while the protruding structures 1606, 1608 and 1610 are designed to enhance the wearer's iris and blend the translucent annular band 1602 in with the iris. The hair-like structures are also translucent. The space between the hair-like structures creates shapes depending on overlapping and underlying elements, including pigmented shapes and features as well as exposed iris. The central portion 1612 of the design graphic 1600 may be clear as this portion of the design corresponds to the pupil. It is important to note; however, that tints may be utilized in this central portion 1612. In addition, the space between the elements of the design may be clear or tinted.

In this exemplary embodiment, the entire limbal design graphic 1600 is a translucent dark brown formed from a composition comprising brown iron oxide, and black iron oxide pigments in proportions to create a color in the brown to black family. The limbal design graphic 1600 comprises translucent elements; however, in other exemplary embodiments it may comprise opaque elements and/or a combination of opaque and translucent elements. The limbal design graphic 1600 is printed utilizing the techniques described in detail subsequently and it is printed first. In other words, it is the first graphic design of the overall design that is to be incorporated into the lens. The order of printing affects the overall design as described in greater detail subsequently.

Figure 16B:
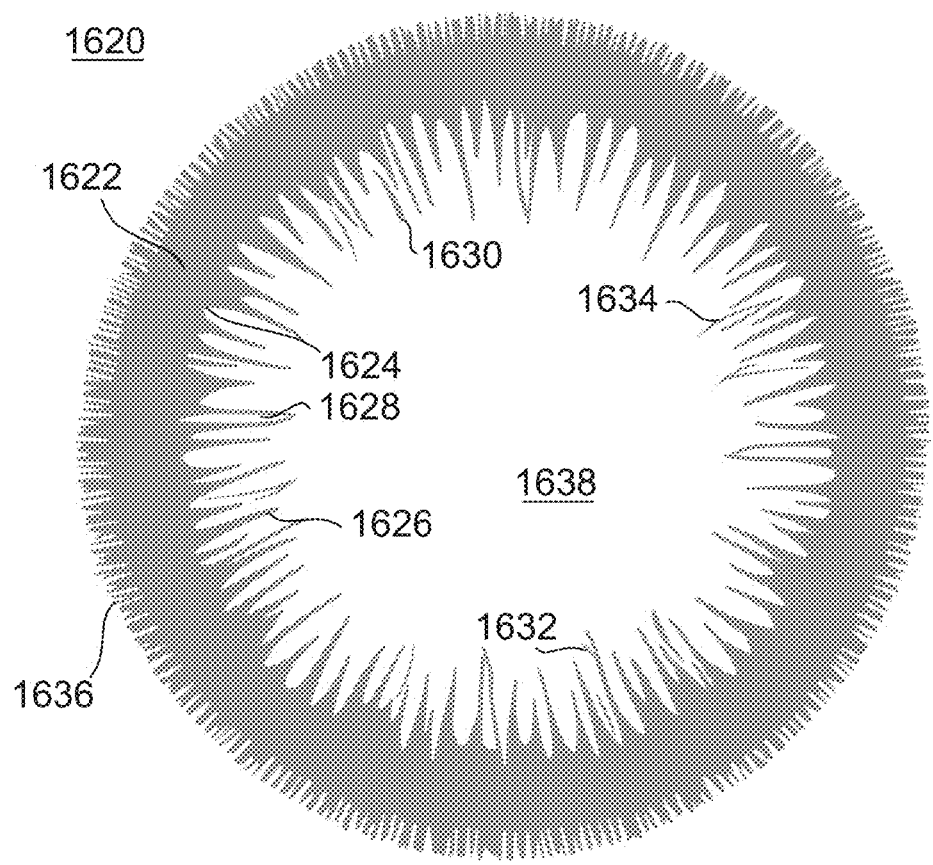
FIG. 16B is a plan view of a third exemplary outer effect design graphic in accordance with the present invention.

FIG. 16B illustrates a third exemplary embodiment of an outer effect design graphic 1620 in accordance with the present invention. It is important to note that the order of the printing of the inner and outer effect graphics are changed in this exemplary embodiment. In the above described exemplary embodiments, the inner effect design graphic is between the limbal design graphic and the outer effect design graphic. In this exemplary embodiment, the outer effect design graphic 1620 comprises a translucent annular band 1622 that is approximately 1.44 mm in width. Connected to and extending from the innermost border 1624 of the translucent annular band 1622 is a plurality of long, medium, and short substantially triangular shaped structures 1626. Some of the substantially triangular shaped structures touch one another at the apex to form an enclosed space 1628. The outer effect design graphic 1620 also comprises a plurality of lines 1630 which are not connected to the translucent annular band 1622 and are interspersed between the substantially triangular shaped structures and oriented in the same direction; namely, towards the geometric center of the outer effect design graphic 1620. Some of the substantially triangular shaped structures or protrusions 1626 have branches 1632 and some of the lines 1630 have branches 1634. All of these structures are designed to look like naturally occurring structures within the iris, for example, pupillary muscle structures, folds or radial furrows, crypts, ciliary structures and the like. The outer perimeter of the annular band 1622 comprises comb-like structure 1636 which alters the appearance of the annular band 1622 to a less defined structure. The comb-like structures 1636 is intended to soften and blend the overlapping line created by overlapping translucent colors from the two layers. All of the elements of the outer effect design graphic 1620 are translucent; however, in other embodiments, the elements may be opaque and/or a combination of translucent and opaque. The outer effect design graphic 1620 is designed to overlie and enhance the translucent annular band 1602 of the limbal design graphic 1600. In addition, the outer effect design graphic 1620 overlies the protruding structures 1606, 1608 and 1610 of the limbal design graphic 1600 in such a way as to have overlapping sections as well as filling in some or portions of the negative space between the protruding structures 1606, 1608 and 1610. The outer effect design graphic 1620 fills in more negative space and the overlapping sections or positive space create areas of additional hues, areas of different levels of opacity and different designs separate and distinct from any single layer. In addition, the negative space left between the overlapping areas creates shapes and patterns that assist in blending and cosmetic effect by working in conjunction with the natural iris. The negative space between the elements of the design creates shapes, depending on overlapping and underlying elements, including pigmented shapes and features as well as exposed iris. The central portion 1638 may be clear as this position of the lens corresponds to the pupil. It is important to note; however, that tints may be utilized in this region. In addition, tints may be utilized in the negative space as well. The comb-like structure 1636 alters the outer diameter of the annular band 1602 of the limbal design graphic 1600 by softening its appearance.

In this exemplary embodiment, the entire outer effect design graphic 1620 is a translucent brown formed from a composition comprising red-iron oxide, titanium dioxide, trans-oxide yellow, phthalocyanine green, yellow iron oxide, brown iron oxide and black iron oxide pigments. In this exemplary embodiment, where the outer effect design graphic 1620 and the limbal design graphic 1600 overlap, they create a darker, more defined/opaque area, while portions of the designs that do not overlap leave a more translucent coloring providing translucent blending from opaque to clear. This technique allows for blending with the natural iris. The outer effect design graphic 1620 comprises a translucent design in this exemplary embodiment; however, in other exemplary embodiments, the design may comprise opaque elements and/or a combination of translucent and opaque elements. The outer effect design graphic 1620 is printed utilizing the techniques described in detail subsequently and is printed second after and on top of the limbal effect graphic layer 1600. This printing order is from the manufacturing standpoint. From an observer's perspective, this layer or graphic would appear behind the limbal design graphic 1600. The outer diameter of the outer effect graphic 1620 is less than the outer diameter of the limbal design graphic 1600 while the inner diameters are substantially equal.

Figure 16C:
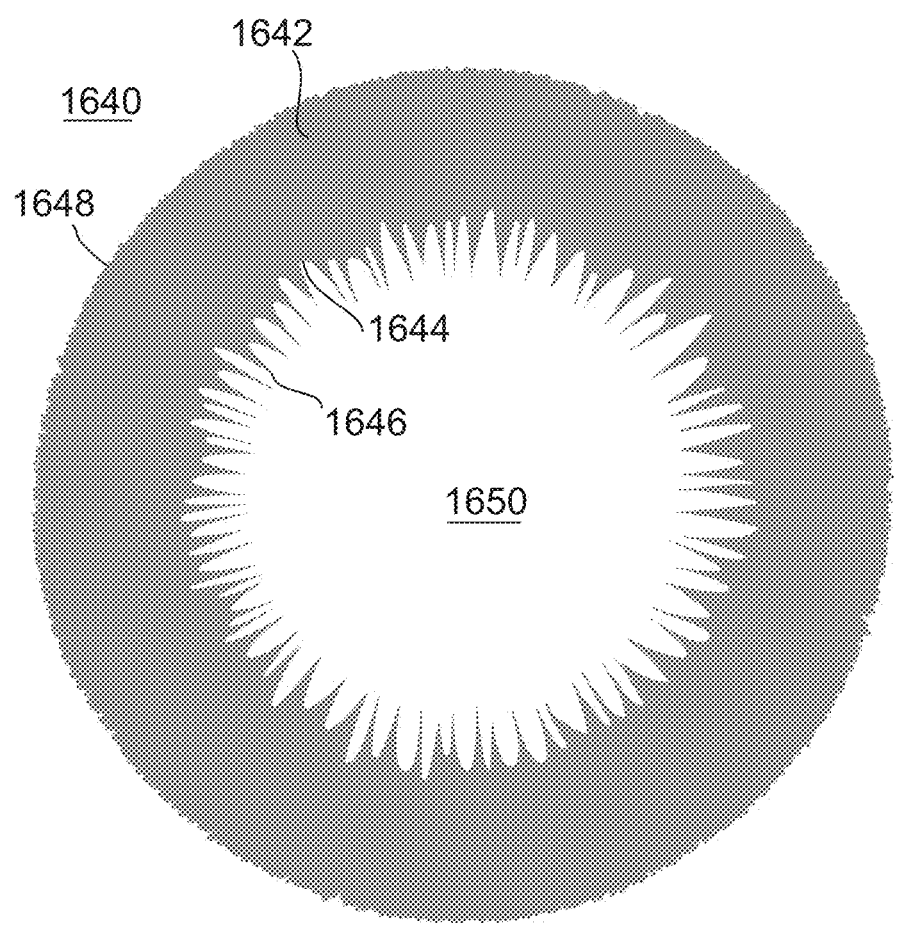
FIG. 16C is a plan view of a third exemplary inner effect design graphic in accordance with the present invention.

FIG. 16C illustrates a third exemplary embodiment of an inner effect design graphic 1640 in accordance with the present invention. In this exemplary embodiment, the inner effect design graphic 1640 comprises a translucent annular band 1642 that is approximately 2.08 mm in width. As may be readily seen from the illustration, the annular band 1642 is much wider than the other annular bands in this embodiment. Connected to and extending from the innermost border 1644 of the annular band 1642 is a plurality of substantially triangular shaped structures or protrusions 1646 extending inwards towards the geometric center of the inner effect design graphic 1640. These protrusions are designed to look like naturally occurring structures within the iris, for example, pupillary muscle structures, folds or radial furrows, crypts, ciliary structures and the like. The outer perimeter of the annular band 1642 comprises an inconsistent surface 1648 to soften/blend a hard line overlapping area which alters the appearance of the annular band 1642 to a less defined structure. It is less pronounced than the comb-like structure 1636 of the outer effect design graphic 1620. The inner effect design graphic 1640 is designed to overlie and enhance the translucent annular bands 1602 and 1622 of the limbal design graphic 1600 and the outer effect design graphic 1620 respectively. Once again, the substantially triangular shaped structures 1646 overlap and fill in the space between the protrusions 1606, 1608 and 1610 of the limbal design graphic 1600 and the elements 1626, 1628 and 1630 of the outer layer design graphic 1620. The sections of overlapping translucent pigment create additional hues within the pattern that may be darker or lighter depending on the colors utilized in the individual underlying structures as well as differing levels of translucency. The space between the elements of the pattern creates shapes, depending on overlapping and underlying elements, including pigmented shapes and features as well as exposed iris. The central portion 1650 of the inner effect graphic 1640 may be clear as this portion of the design corresponds to the pupil. It is important to note; however, that tints may be utilized in the central portion 1650 as well as in the negative space.

In this exemplary embodiment, the entire inner effect design graphic 1640 is a translucent yellow formed from a composition comprising trans-oxide yellow, yellow iron oxide, brown iron oxide, and trans-oxide red pigments in proportions to create a color in the yellow family. As set forth above, yellow is part of the orange family which also includes golds. These colors are meant to highlight the underlying natural iris color for individuals with brown or dark eyes. Different colors would be utilized for lighter eye color. The inner effect design graphic 1640 is printed utilizing the techniques described in detail subsequently and is printed third in order after the outer effect graphic 1620. In other words, the inner effect graphic 1640 is printed after and on top of the outer design graphic 1620. This printing order is from the manufacturing standpoint. From an observer's perspective, this layer would appear behind the other layers. The inner effect design graphic 1640 comprises translucent elements but in alternative exemplary embodiments, it may comprise opaque elements and/or a combination of opaque and translucent elements. The outer diameter of the inner effect design graphic 1640 is less than the outer diameter of the limbal design graphic 1600 while the inner diameters are substantially equal.

Figure 16D:
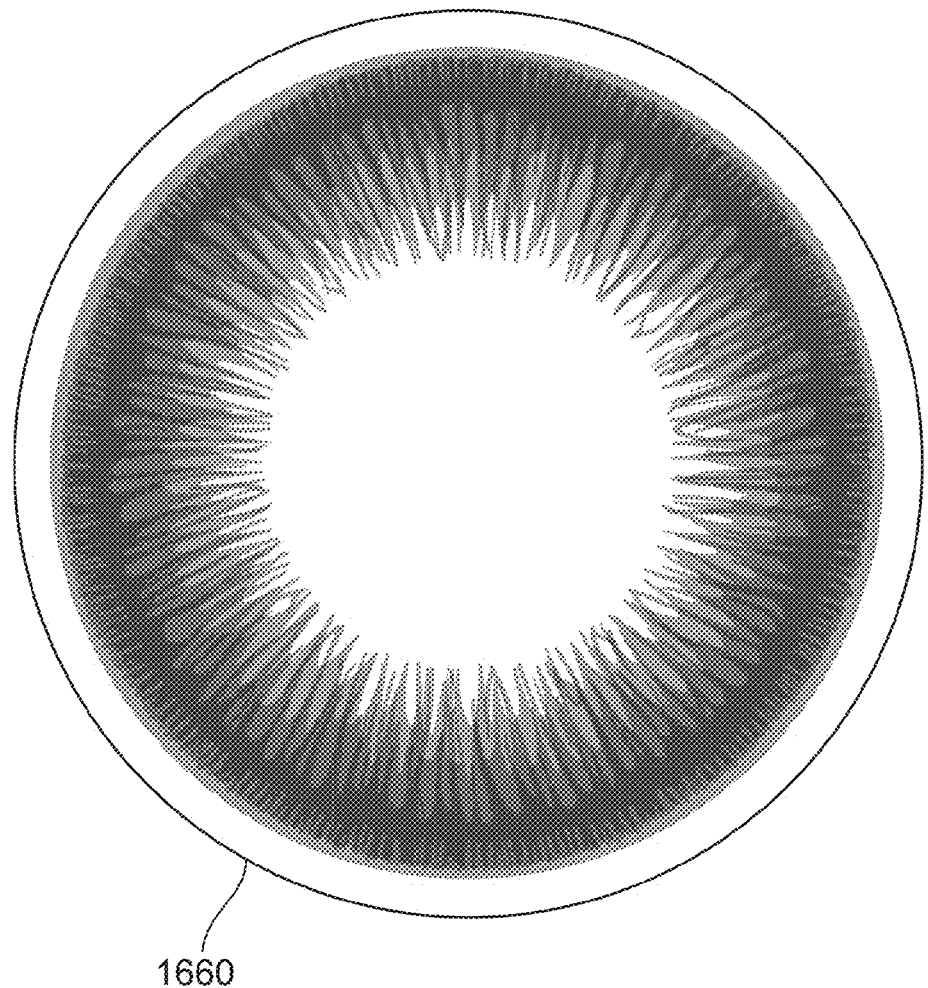
FIG. 16D is a plan view of a third exemplary cosmetic contact lens comprising the three design graphics of FIGS. 16A, B and C in accordance with the present invention.

FIG. 16D illustrates a third exemplary embodiment of a cosmetic contact lens 1660 comprising all three layers or design graphics 1600, 1620 and 1640 printed in the order described above. It is important to note that the printing order is different than in the other two exemplary embodiments described above as the inner and outer effect layers are switched. In addition, all three design graphics have annular bands creating a unique limbal ring design pattern. While the printing order is described from a manufacturing perspective, when an observer is viewing the contact lens on eye, the visual effect is that of seeing the layers or design graphics in a reverse order from that used in printing. As shown, the overlapping layers comprise different colors, different hues, different levels of lightness, different levels of darkness and patterns forming a unique structure. Changes in either both the printing order or colors will result in a different design. In addition, changes in translucency may also be achieved.

The overall design created by the three layers comprises an annular structure with an inner diameter of about 6.7 mm and an outer diameter in the range from about 12.650 mm to about 12.725 mm. This annular structure is similar to the iris structure of the eye by design. The open or negative space in the center of the lens corresponds to the pupillary region or optical zone of the eye and is preferably clear so as not to interfere with vision. However, as set forth above, this region may be tinted as may be the negative space between elements.

Figure 17A:
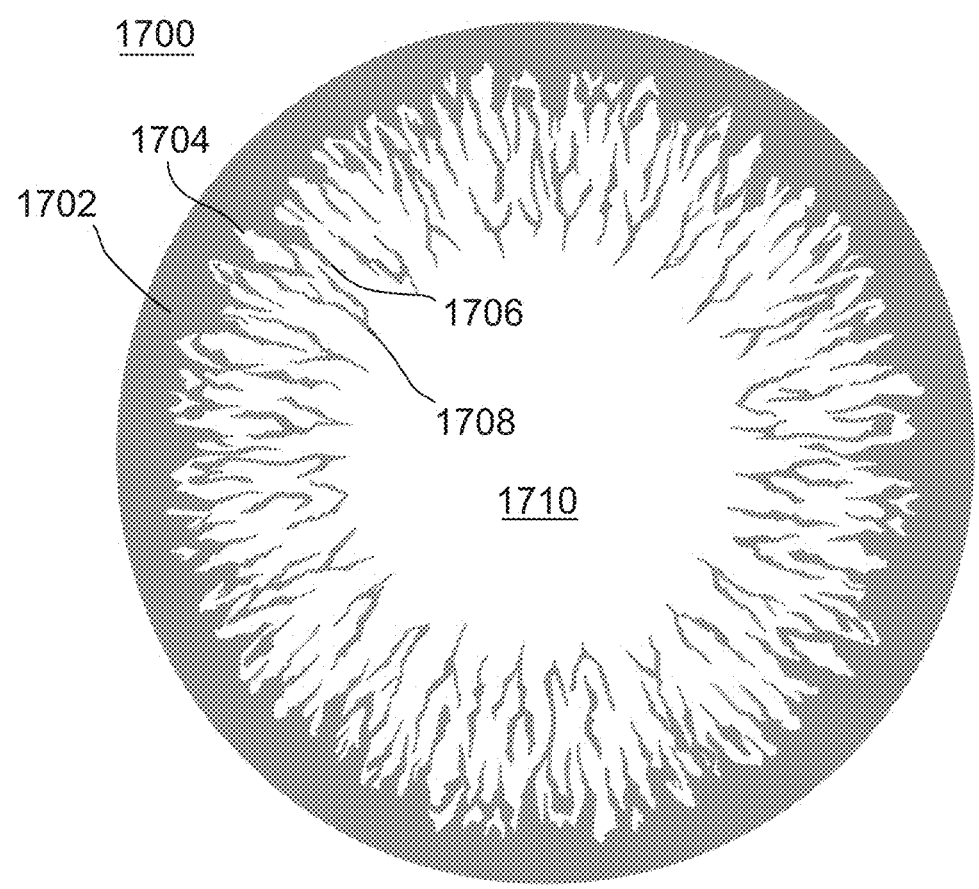
FIG. 17A is a plan view of a fourth exemplary limbal design graphic in accordance with the present invention.

Referring to FIG. 17A, there is illustrated a fourth exemplary embodiment of a limbal design graphic 1700 in accordance with the present invention. In this exemplary embodiment, the limbal design graphic 1700 comprises a translucent annular band 1702 that is approximately 0.85 mm in width. Connected to and extending from the innermost border 1704 of the translucent annular band 1702 towards the geometric center of the limbal design graphic 1700 are a plurality of geometric structures 1706 that resemble crypts in a natural iris. Additional geometric structures 1708 also extend towards the geometric center of the limbal design graphic 1700, but are not attached to the translucent annular band 1702. Crypts are a physical feature found on the natural iris that are a series of openings located on either side of the collarette. Crypts on the base of the iris are additional openings that may be observed close to the outermost part of the ciliary portion of the iris. As stated above, all of the elements in the design graphics are designed to look like naturally occurring structures within the iris, for example, pupillary muscle structures, folds or radial furrows, crypts, ciliary structures and the like. The translucent annular band 1702 is designed to overlie and enhance the wearer's limbal region while the protruding structures 1706 and 1708 are designed to enhance the wearer's iris and blend the annular band 1702 in with the iris. The space between the geometric structures creates shapes depending on overlapping and underlying elements, including pigmented shapes and features as well as exposed iris. The central portion 1710 of the design graphic 1700 may be clear as this portion of the region corresponds to the pupil. It is important to note; however, that tints may be utilized in this central portion 1710. In addition, tints may be utilized in the space between the elements.

In this exemplary embodiment, the entire limbal design graphic 1700 is a translucent dark brown formed from a composition comprising brown iron oxide, and black iron oxide pigments in proportions to create a color in the brown to black family. Although the limbal design graphic is translucent, in other exemplary embodiments, it may comprise opaque elements and/or a combination of opaque and translucent elements. The limbal design graphic 1700 is printed utilizing the techniques described in detail subsequently and it is printed first. In other words, it is the first graphic design of the overall design that is to be incorporated into the lens. The order of printing affects the overall design as described in greater detail subsequently.

Figure 17B:
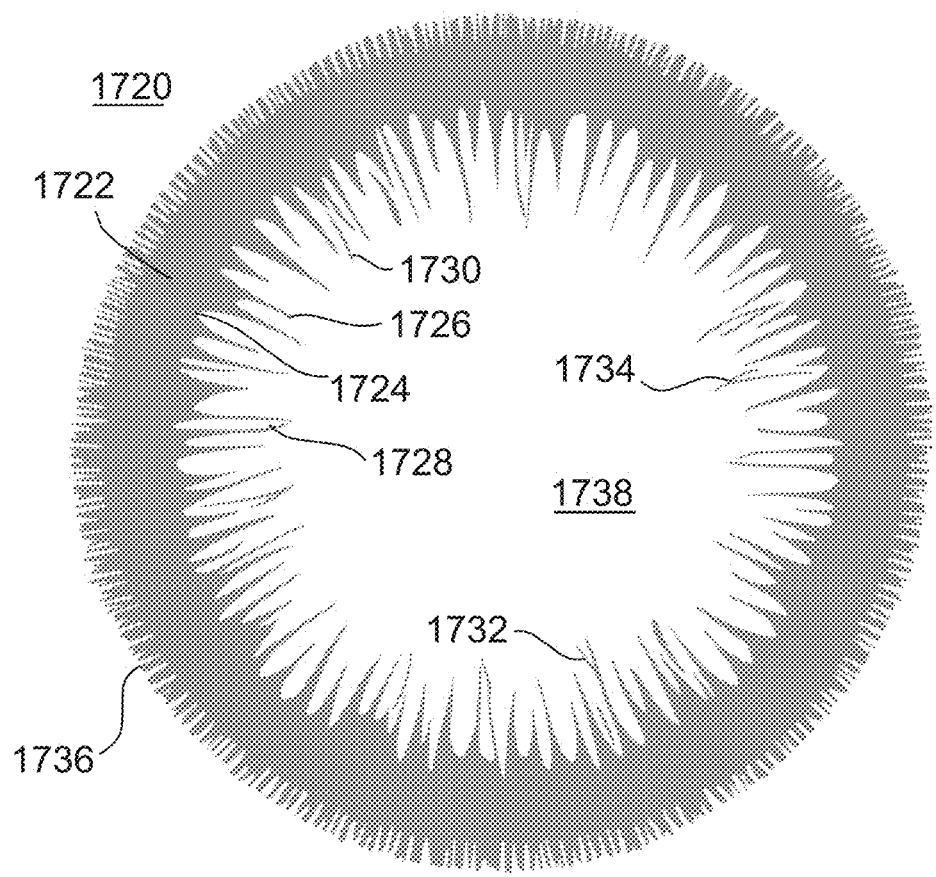
FIG. 17B is a plan view of a fourth exemplary outer effect design graphic in accordance with the present invention.

FIG. 17B illustrates a fourth exemplary embodiment of an outer effect design graphic 1720 in accordance with the present invention. It is important to note that the order of the printing of the inner and outer effect graphics are changed in this exemplary embodiment relative to the first two exemplary embodiments. In this exemplary embodiment, the outer effect design graphic 1720 comprises a translucent annular band 1722 that is approximately 0.89 mm in width. Connected to and extending from the innermost border 1724 of the translucent annular band 1722 are a plurality of long, medium, and short substantially triangular shaped structures 1726. Some of the substantially triangular shaped structures touch one another at the apex to form an enclosed space 1728. The outer effect design graphic 1720 also comprises a plurality of lines 1730 which are not connected to the translucent annular band 1722 and are interspersed between the substantially triangular shaped structures and oriented in the same direction; namely, towards the geometric center of the outer effect design graphic 1720. Some of the substantially triangular shaped structures or protrusions 1726 have branches 1732 and some of the lines 1730 have branches 1734. All of these structures are designed to look like naturally occurring structures within the iris, for example, pupillary muscle structures, folds or radial furrows, crypts, ciliary structures and the like. The outer perimeter of the annular band 1722 comprises comb-like structure 1736 which alters the appearance of the transparent annular band 1722 to a less defined structure. The comb-like structure 1736 is intended to soften and blend the overlapping line created by overlapping translucent colors from the other layers. The outer effect design graphic 1720 is designed to overlie and enhance the translucent annular band 1702 of the limbal design graphic 1700. In addition, the outer effect design graphic 1720 overlies the protruding structures 1706 and 1708 of the limbal design graphic 1700 in such a way as to have overlapping sections as well as filling in some or portions of the negative space between the protruding structures 1706 and 1708. The outer effect design graphic 1720 fills in more negative space and the overlapping sections or positive space create areas of additional hues, areas of different levels of opacity and different designs separate and distinct from any single layer. In addition, the negative space left between the overlapping areas creates shapes and patterns that assist in blending and cosmetic effect by working in conjunction with the natural iris. The negative space between the elements of the design creates shape, depending on overlapping and underlying elements; including pigmented shapes and features as well as exposed iris. The central portion 1738 may be clear as this portion of the lens corresponds to the pupil. It is important to note; however, that tints may be utilized. In addition, tints may be utilized in the negative space of the design. The comb-like structure 1736 alters the outer diameter of the annular band 1702 of the limbal design graphic 1700 by softening its appearance.

In this exemplary embodiment, the entire outer effect design graphic 1720 is a translucent brown formed from a composition comprising red-iron oxide, titanium dioxide, trans-oxide yellow, yellow iron oxide, brown iron oxide and black iron oxide pigments in proportion to create a color that is in the brown to black family. In this exemplary embodiment, where the outer effect design graphic 1720 and the limbal design graphic 1700 overlap, they create a darker, more defined/opaque area, while the portions of the designs that do not overlap have a more translucent coloring providing translucent blending from opaque to clear. This technique allows for blending with the natural iris. The outer effect design graphic 1720 comprises translucent elements, but may include opaque as well as a combination of translucent and opaque elements in other embodiments. This outer effect graphic 1720 is printed utilizing the techniques described in detail subsequently and is printed second in order after and on top of the limbal effect graphic layer 1700. This printing order is from the manufacturing standpoint. From an observer's perspective, this layer or graphic would be behind the limbal layer 1700. The outer diameter of the outer effect graphic 1720 is less than the outer diameter of the limbal design graphic 1700 while the inner diameters are substantially equal.

Figure 17C:
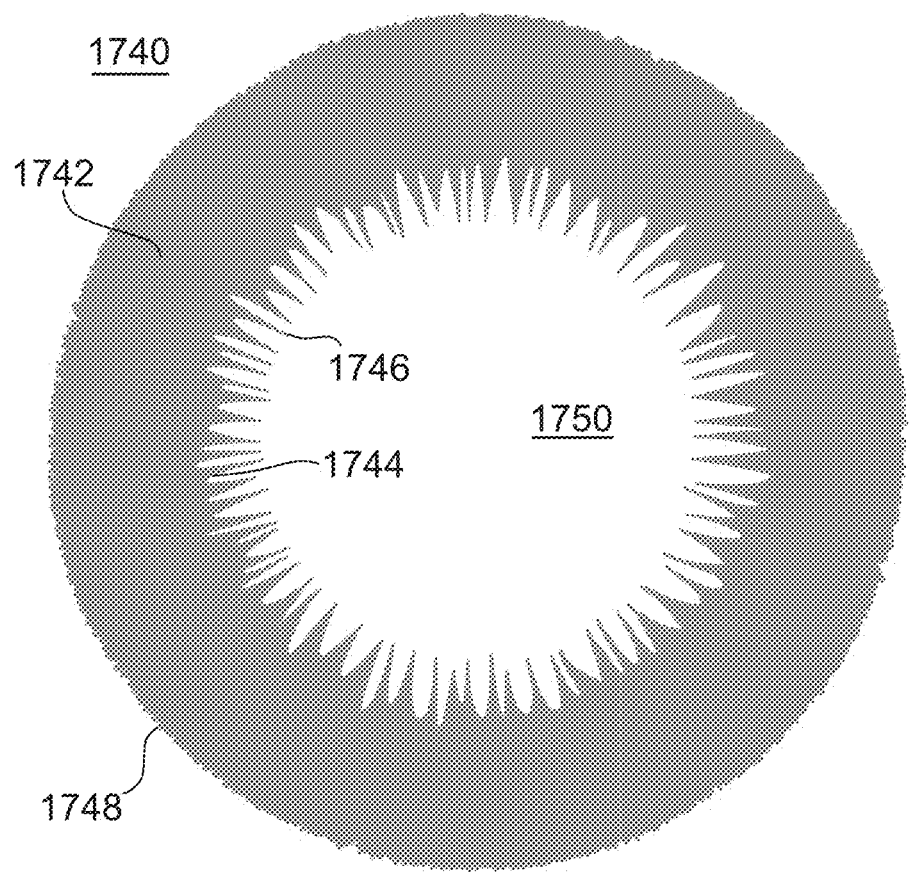
FIG. 17C is a plan view of a fourth exemplary inner effect design graphic in accordance with the present invention.

FIG. 17C illustrates a fourth exemplary embodiment of an inner effect design graphic 1740 in accordance with the present invention. In this exemplary embodiment, the inner effect design graphic 1740 comprises a translucent annular band 1742 that is approximately 2.03 mm in width. As may be readily seen from this illustration, the annular band 1742 is much wider than the other annular bands in this exemplary embodiment. Connected to and extending from the innermost border 1744 of the translucent annular band 1742 is a plurality of substantially triangular shaped structures or protrusions 1746 extending inwards towards the geometric center of the inner effect design graphic 1740. These protrusions are designed to look like naturally occurring structures within the iris, for example, pupillary muscle structures, folds or radial furrows, crypts, ciliary structures and the like. The outer perimeter of the annular band 1742 comprises an inconsistent surface 1748 to soften/blend a hard line overlapping area which alters the appearance of the translucent annular band 1742 to a less defined structure. It is less pronounced than the comb-like structure 1736 of the outer effect design graphic 1720. The inner effect design graphic 1740 is designed to overlie and enhance the translucent annular bands 1702 and 1722 of the limbal design graphic 1700 and the outer effect design graphic 1720 respectively. Once again, the substantially triangular shaped structures 1746 overlap and fill in the space between the protrusions 1706 and 1708 of the limbal design graphic 1700 and the elements 1726, 1728 and 1730 of the outer layer design graphic 1720. The sections of overlapping translucent pigment create additional hues within the pattern that may be darker or lighter depending on the colors utilized in the individual underlying structures as well as differing levels of translucency. The space between the elements of the pattern creates shapes, depending on overlapping and underlying elements, including pigmented shapes and features as well as exposed iris. The central portion 1750 of the inner effect graphic 1740 may be clear as this portion of the design corresponds to the pupil. It is important to note; however, that tints may be utilized in this region or zone as well as in the negative space of the design.

In this exemplary embodiment, the entire inner effect design graphic 1740 is a translucent brown formed from a composition comprising red iron oxide, phthalocyanine blue, titanium dioxide, trans-oxide yellow, yellow iron oxide, brown iron oxide, and black iron oxide pigments in proportions to create a color in the brown to black family. This inner effect design graphic 1740 is printed utilizing the techniques described in detail subsequently and is printed third in order after the outer effect graphic 1720. In other words, the inner effect design graphic 1740 is printed after and on top of the outer design graphic 1720. The printing order is from the manufacturing standpoint. From an observer's perspective, this layer or graphic would appear behind the other layers or graphics. The inner effect design graphic 1740 comprises translucent elements, but may also comprise opaque elements and/or a combination of opaque and translucent elements. The outer diameter of the inner effect design graphic 1740 is less than the outer diameter of the limbal design graphic 1700 while the inner diameters are substantially equal.

Figure 17D:
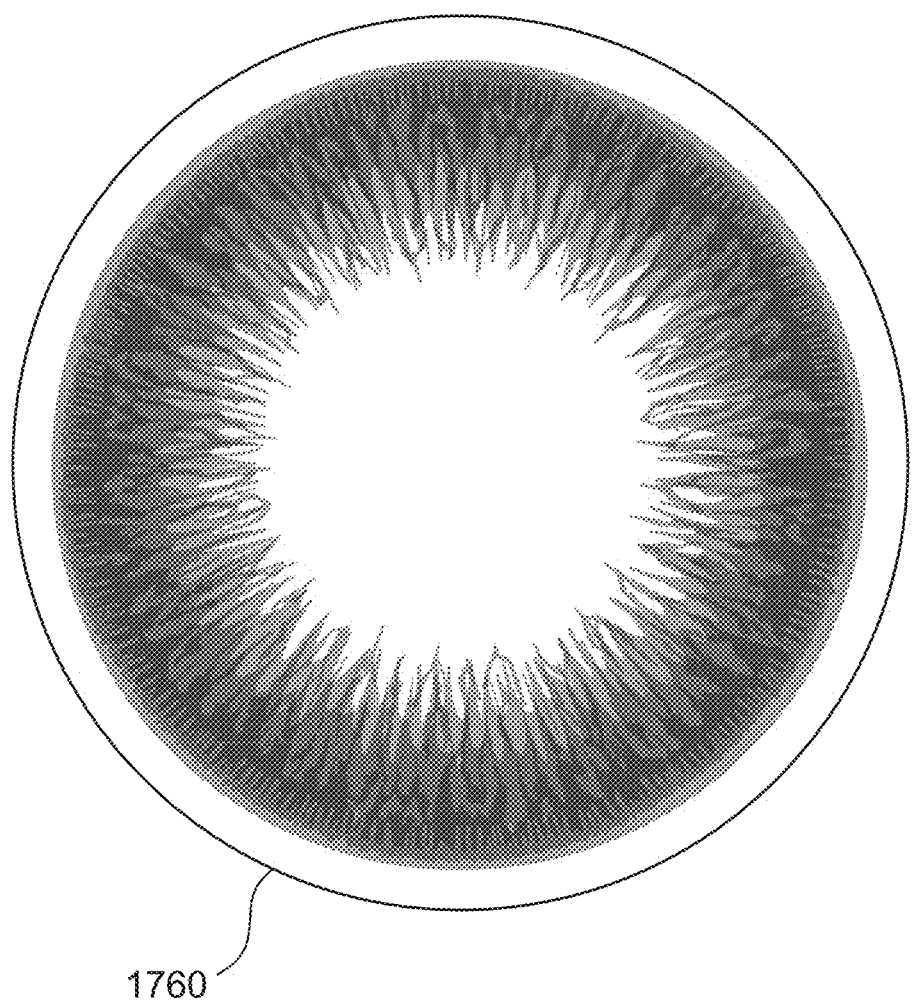
FIG. 17D is a plan view of a fourth exemplary cosmetic contact lens comprising the three design graphics of FIGS. 17A, B and C in accordance with the present invention.

FIG. 17D illustrates a fourth exemplary embodiment of a cosmetic contact lens 1760 comprising all three layers or design graphics 1700, 1720 and 1740 printed in the order described above. It is important to note that the printing order is different than in the other two exemplary embodiments described above as the inner and outer effect layers are switched as in the previous exemplary embodiments described above. In addition, all three design graphics have annular bands creating a unique limbal ring design pattern. While the printing order is described from a manufacturing perspective, when an observer is viewing the contact lens on eye, the visual effect is that of seeing the design graphics in a reverse order from that described above. As shown, the overlapping layers comprise different colors, different hues, different levels of lightness, and different levels darkness and patterns forming a unique structure. Changes in either both the printing order or colors will result in a different design. Changes in translucency may also be achieved.

The overall design created by the three layers comprises an annular structure with an inner diameter in the range from about 6.4 to about 6.6 mm and an outer diameter in the range from about 12.70 mm to about 12.775 mm. This annular structure is similar to the iris structure of the eye by design. The open or negative space in the center of the lens corresponds to the pupillary region or optical zone of the eye and is preferably clear so as not to interfere with vision. However, as set forth above, this region may be tinted as may be the negative space between the elements of the design.

Figure 18A:
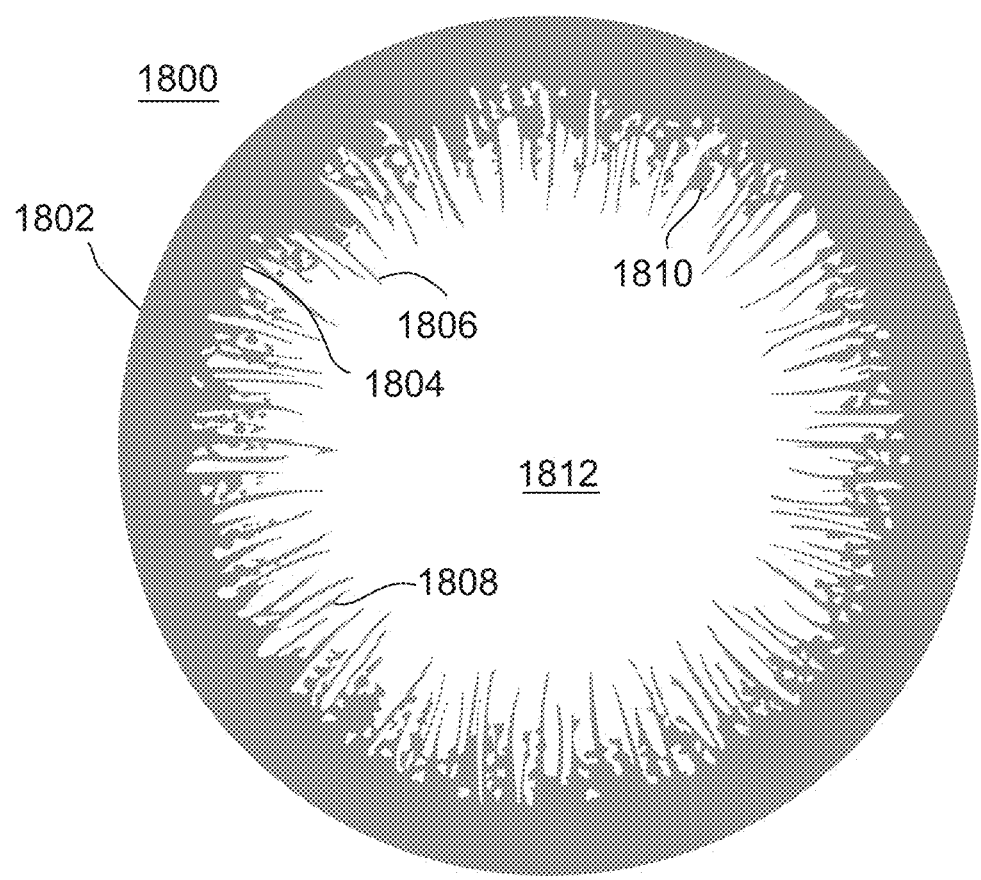
FIG. 18A is a plan view of a fifth exemplary limbal design graphic in accordance with the present invention.

Referring to FIG. 18A, there is illustrated a fifth exemplary embodiment of a limbal design graphic 1800 in accordance with the present invention. In this exemplary embodiment, the limbal design graphic 1800 comprises a translucent annular band 1802 that is approximately 1.15 mm in width. Connected to and extending from the innermost border 1804 of the translucent annular band 1802 towards the geometric center of the limbal design graphic 1800 are plurality long, medium and short hair-like structures 1806. Additional hair-like structures 1808 which are not connected to the translucent annular band 1802 are interspersed between the other hair-like structures 1806. Additional structures 1810 are free form geometric shapes that may resemble circles, squares, triangles and any combination thereof. These shapes may touch one another or be independent of one another, and overlie and occupy the space between the hair-like structures 1806 and 1808. All of these structures are designed to look like naturally occurring structures within the iris, for example, pupillary muscle structures, folds or radial furrows, crypts, ciliary structures and the like. The translucent annular band 1802 is designed to overlie and enhance the wearer's limbal region while the protruding structures 1806, 1808 and 1810 are designed to enhance the wearer's iris and blend the translucent annular band 1802 in with the wearer's iris. The space between the hair-like structures create shapes depending on overlapping and underlying elements, including pigmented shapes and features as well as exposed iris. The central portion 1812 of the limbal design graphic 1800 may be clear as this portion of the design corresponds to the pupil. It is important to note; however, that tints may be utilized in this central portion. In addition, tints may be utilized in the negative space between design elements.

In this exemplary embodiment, the entire limbal design graphic 1800 is a transparent black formed from black iron oxide pigments. In other embodiments, the limbal design graphic may comprise opaque elements and/or a combination of opaque and translucent elements. The limbal design graphic 1800 is printed utilizing the techniques described in detail subsequently and it is printed first. In other words, it is the first graphic layer of the overall design that is to be incorporated into the lens. The order of printing affects the overall design as described in greater detail subsequently.

Figure 18B:
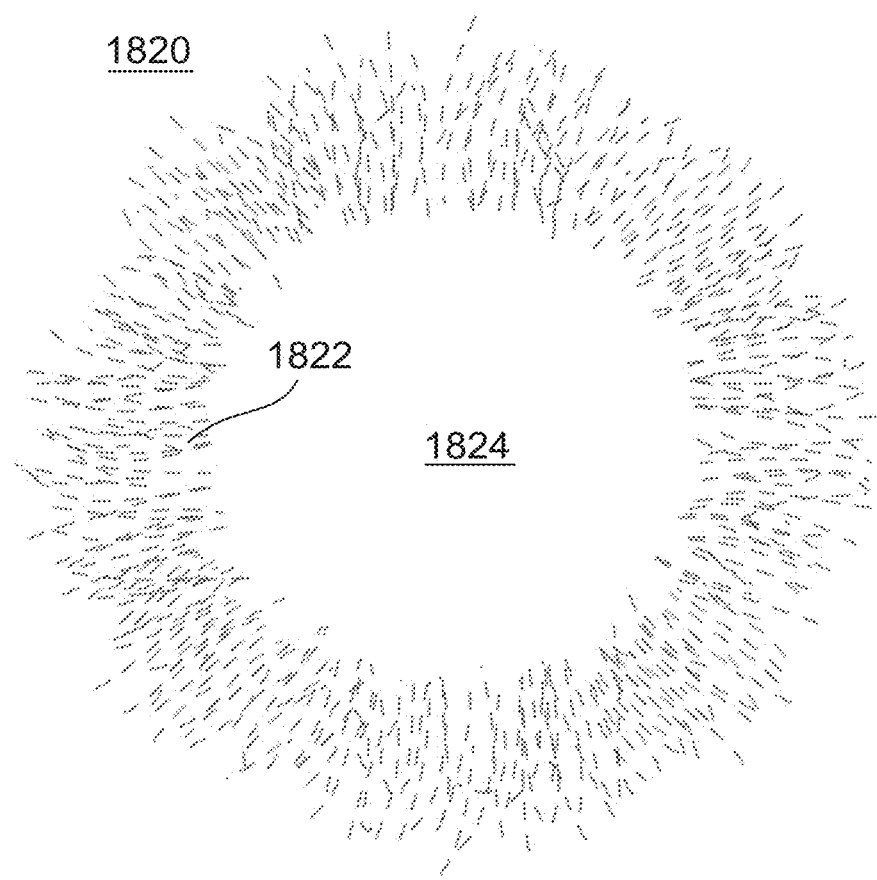
FIG. 18B is a plan view of a fifth exemplary inner effect design graphic in accordance with the present invention.

FIG. 18B illustrates a fifth exemplary embodiment of an inner effect design graphic 1820 in accordance with the present invention. The inner effect graphic 1820 comprises an annular band of non-interconnected, long, medium and short dotted/dashed lines 1822 generally oriented towards the geometric center of the inner effect graphic 1820. The overall effect is designed to look like naturally occurring structures within the iris, for example, pupillary muscle structures, folds or radial furrows, crypts, ciliary structures and the like. In this exemplary embodiment, the inner effect design graphic 1820 serves to provide a subtle enhancement that retains translucency and/or color in a given area while hinting at the directional lines that may be found in the radial furrows or ciliary zone of the natural iris. This subtle enhancement also functions to impart small pin-points of highlight. The inner effect design graphic 1820 is designed to overlie and enhance the wearer's iris and at least partially overlaps with the translucent annular band 1802 of the limbal design graphic 1800. In addition, the inner effect design graphic 1820 overlies the protruding structures 1806, 1808, and 1810 of the limbal design graphic 1800 in such a way as to have overlapping opaque sections as well as filling in some or a portion of the negative space between the protruding structures 1806, 1808, and 1810. The sections that overlap will be of a different color than the individual underlying structures as well as a different level of translucency. In addition, the overlapping areas may be darker or lighter depending on the colors utilized in the underlying individual structures. The space between the elements of the pattern creates shapes, depending on overlapping and underlying elements, including pigmented shapes and features as well as exposed iris. The central portion 1824 of the design graphic 1820 may be clear as this portion of the design corresponds to the pupil. It is important to note; however, that tints may be utilized in this region as well as in the negative space between design elements.

In this exemplary embodiment, the entire inner effect design graphic 1820 is a transparent orange formed from a composition comprising red iron oxide, trans-oxide yellow, yellow iron oxide, brown iron oxide, and trans-oxide red pigments in proportions to create a color in the orange family. The orange family includes yellows and golds. These colors or colors in this family are meant to highlight the underlying natural iris color for individuals with brown or dark eyes. Different colors would be utilized for individuals with light eyes. The inner effect graphic 1820 may comprise opaque elements and/or a combination of opaque and translucent elements in alternative embodiments. This inner effect graphic 1820 is printed utilizing the techniques described in detail subsequently and is printed second in order after the limbal graphic 1800. In other words, the inner effect graphic 1820 is printed after and on top of the limbal design graphic 1800. This printing order is from a manufacturing standpoint. From an observer's perspective, this layer would appear behind the graphic 1800. The outer diameter of the inner effect design graphic 1820 is less than the outer diameter of the limbal design graphic 1800 while the inner diameters are substantially equal.

Figure 18C:
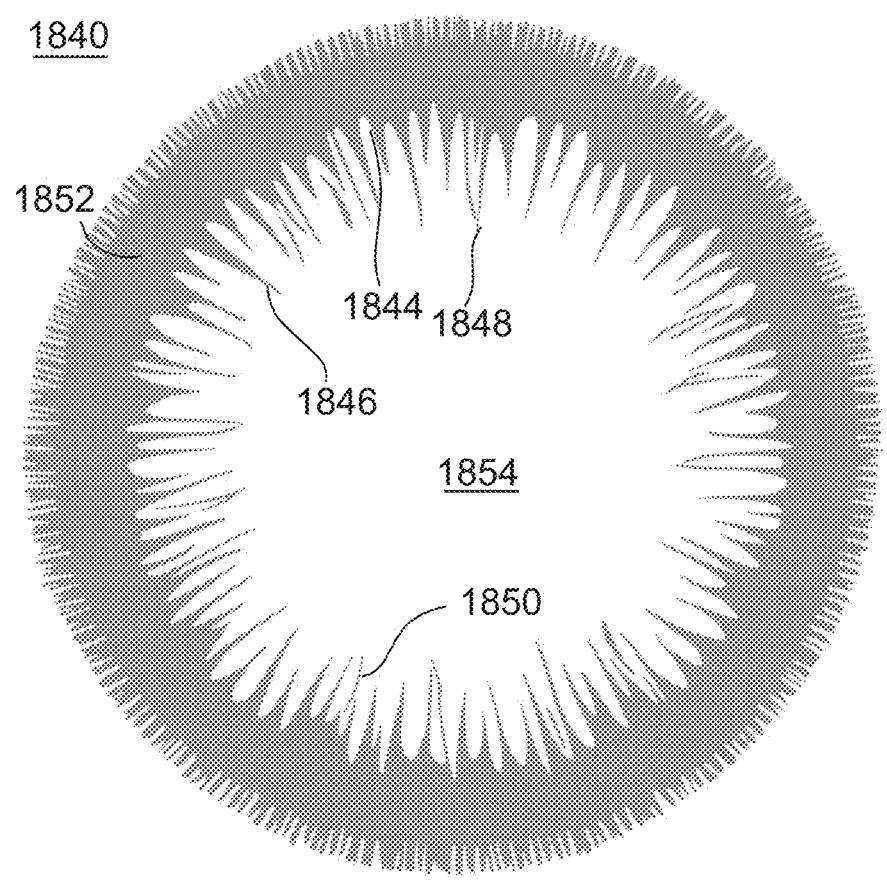
FIG. 18C is a plan view of a fifth exemplary outer effect design graphic in accordance with the present invention.

FIG. 18C illustrates a fifth exemplary embodiment of an outer effect design graphic 1840 in accordance with the present invention. In this exemplary embodiment, the outer effect design graphic 1840 comprises a translucent annular band 1842 that is approximately 1.44 mm in width. Connected to and extending from the innermost border 1844 of the translucent annular band 1842 is a plurality of long, medium, and short substantially triangular shaped structures 1846. Some of the substantially triangular shaped structures touch one another at the apex to form an enclosed space 1848. The outer effect design graphic 1840 also comprises a plurality of lines 1850 which are not connected to the translucent annular band 1842 and are interspersed between the substantially triangular shaped structures and oriented in the same direction; namely, towards the geometric center of the outer effect design graphic 1840. These structures are designed to look like naturally occurring structures within the iris, for example, pupillary muscle structures, folds or radial furrows, crypts, ciliary structures and the like. The outer perimeter of the annular band 1842 comprises comb-like structure 1852 which alters the appearance of the translucent annular band 1842 to a less defined structure. The comb-like structure 1852 is intended to soften and blend the overlapping line created by overlapping translucent colors from the three layers. The outer effect design graphic 1840 is designed to overlie and enhance the translucent annular band 1802 of the limbal design graphic 1800 as well as the entire inner effect design graphic 1820 and the protruding structures 1806, 1808, and 1810 of the limbal design graphic 1800. The outer layer design graphic 1840 fills in more negative space and the overlapping sections or positive space creates additional hues, areas of different levels of opacity and different designs separate and distinct from any single layer. In addition, the negative space left between the overlapping areas creates shapes and patterns that assist in blending and cosmetic effect by working in conjunction with the natural iris. The negative space between the elements of the design creates shapes, depending on overlapping and underlying elements, including pigmented shapes and features as well as exposed iris. The central portion 1854 may be clear as this portion of the lens corresponds to the pupil. It is important to note; however, that tints may be utilized. The comb-like structure 1852 alters the outer diameter of the translucent annular band 1802 of the limbal design graphic by creating a shape that disrupts the hard line of the limbal design graphic 1800.

In this exemplary embodiment, the entire outer effect design graphic 1840 is a translucent brown formed from a composition comprising red iron oxide, titanium-dioxide, trans-oxide yellow, yellow-iron oxide, brown iron oxide and black iron oxide pigments to create a family or colors ranging from brown to black. In this exemplary embodiment where the outer effect design graphic 1840 and the limbal design graphic 1800 overlap, they create a darker, more defined/opaque area, while the portions of the designs that do not overlap leave a more translucent coloring providing translucent blending from opaque to clear. This technique allows for blending with the natural iris. This outer effect graphic 1840 is printed utilizing the techniques described in detail subsequently and is printed third in order after and on top of the inner effect graphic layer 1820. This printing order is from the manufacturing standpoint. From an observer's perspective this layer would appear behind the inner design graphic 1820. The outer diameter of the outer effect graphic 1840 is less than the outer diameter of the limbal design graphic 1800 while the inner diameters are substantially equal.

Figure 18D:
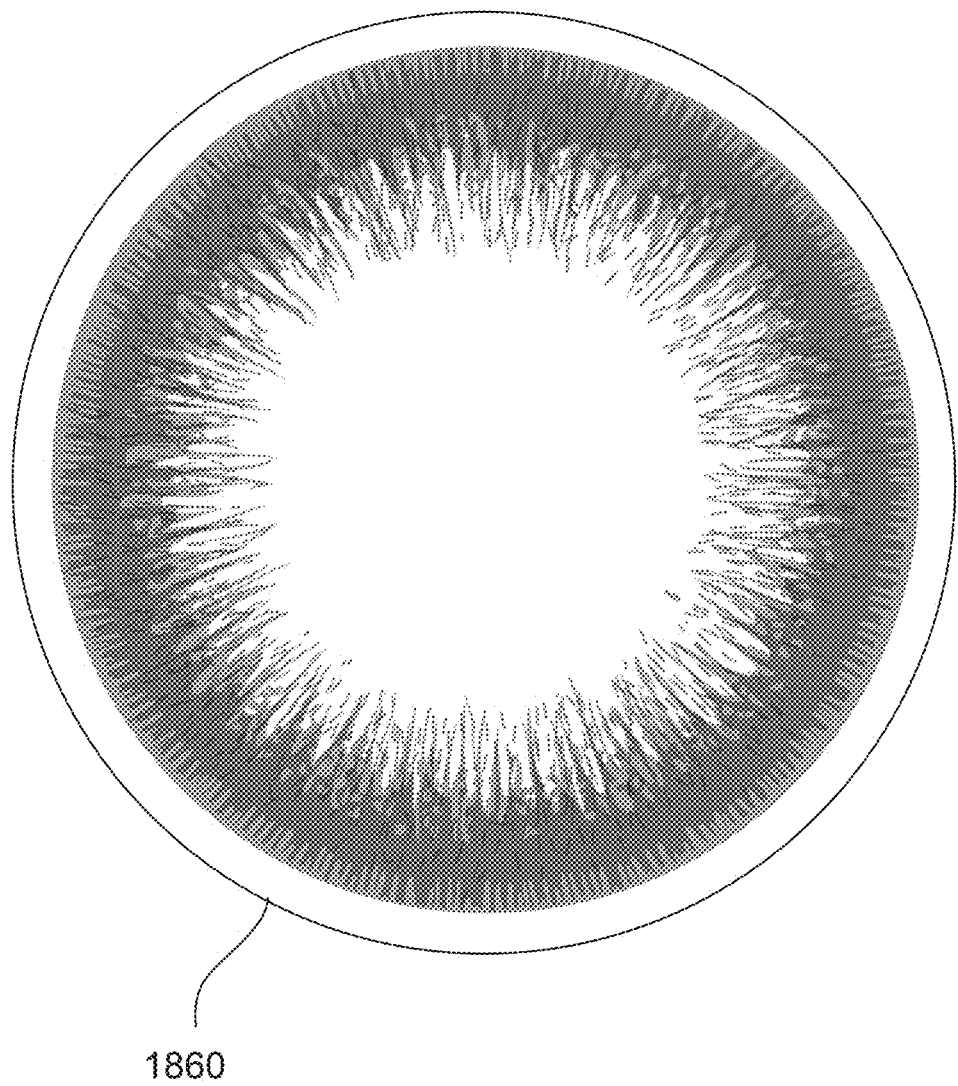
FIG. 18D is a plan view of a fifth exemplary cosmetic contact lens comprising the three design graphics of FIGS. 14A, B and C in accordance with the present invention.

FIG. 18D illustrates a fifth exemplary embodiment of a cosmetic contact lens 1860 comprising all three layers or design graphics 1800, 1820 and 1840 printed in the order described above. Once again the order of the printing has returned back to the limbal, inner and outer effect graphics as is the case with the first two exemplary embodiments. While the printing order is described from a manufacturing perspective, when an observer is viewing the contact lens on eye, the visual effect is that of seeing the layers or design graphics in reverse order from that described with respect to printing. As shown, the overlapping layers comprise different colors, hues, lightness, darkness and patterns forming a unique structure. Changes in either both the printing order or colors will result in a different design as set forth in detail subsequently. Changes in translucency may also be achieved.

The overall design created by the three layers comprises an annular structure with an inner diameter in the range from about 6.7 to about 7.1 mm and an outer diameter in the range from about 12.675 mm to about 12.750 mm. This annular design is similar to the iris structure of the eye by design. The open or negative space in the center of the lens corresponds to the pupillary region or optical zone of the eye and is preferably clear so as not to interfere with vision. However, tints may be utilized in this region as well as in the negative space between design elements.

The above described exemplary embodiments relate to contact lenses that comprise a multi-layer design which may be utilized to enhance and/or highlight the appearance of the eyes upon which the contact lenses are positioned while maintaining a natural look. These exemplary designs each comprise three layers; namely, a unique limbal design graphic, a unique inner effect graphic and a unique outer effect graphic. The layers may be formed utilizing any number of design elements and design principles. For example, lines may be utilized to define shapes and create contours that imitate or mimic line structures, shapes and contours found in a natural iris. Color and hue values with varying levels of translucency and opacity may be utilized to create blending and contrast while varying color and hues may be utilized to imply depth by forming highlight and shadow. Space may be utilized to determine composition, for example, positive space may be utilized to define and imply effects while negative space may be utilized to allow the natural iris to contribute to the effect of the overall pattern. Perspective in overlapping layers may be utilized to imply and demonstrate depth within a given pattern. Texture may be utilized to create variation in the iris. As used in two dimensional art, texture is created by the use of light and dark. Light and dark elements may also be utilized to imply depth and form.

As set forth above, the present invention utilizes three distinct layers to provide more depth and variation in the overall pattern. The limbal design graphic is the portion of the overall pattern that surrounds the outer diameter of the iris and is closest to the sclera and is meant to highlight, enhance and/or define the limbal region of the eye; however, it also comprises elements that extend into the iris. The inner effect graphic layer is the portion of the overall pattern that is meant to enhance the iris; however, it may comprise a portion that also contributes to highlighting, enhancing and/or defining the limbal region of the eye. The outer effect graphic layer is the portion of the overall pattern that is meant to enhance the iris; however, it may comprise a portion that also contributes to highlighting, enhancing and/or defining the limbal region of the eye. The multiple layer approach of the present invention may be utilized to create varying levels of transparency and/or opacity utilizing overlapping and non-overlapping translucent layers.

While the above described exemplary embodiments illustrate the various design features that may be utilized in a cosmetic contact lens, it is important to note that various combinations and sub-combinations of the elements/features may be utilized to create new designs. A change in the order of print may impact the overall design. A change in any single color in at least one layer may impact the overall design. A change in the design in any single layer may impact the overall design and a change in any of the features of any design in any single layer may impact the overall design. A change in the size of any design and/or the degree of overlap between the layers may impact the overall design. A change in the amount of negative space/positive space in any single layer or in each of the layers may impact the overall design. A change in the translucency of any or all of the layers may impact the overall design. In addition, additional layers may also impact the overall design. The exemplary embodiments set forth above illustrate the different designs that may be achieved utilizing the various design elements described herein.

Although a number of terms are utilized throughout the specification, all designs described herein are meant to enhance the appearance of a wearers' eyes. Accordingly, as used herein the term enhance shall include accentuate, highlight, define, demark, improve, reinforce, amplify, magnify, intensify and/or any action which cosmetically alters the appearance of a wearers' eyes.

It is important to note that all of the color formulations set forth herein and related to the present invention are generally described with respect to the pigment content and are generally classified as a particular color. It is also important to note that any suitable colors may be utilized in implementing the present invention.

The designs/patterns/colors for the different regions of a cosmetic contact lens are developed based upon market research. These patterns are then etched into metal structures generally referred to as a cliché. More specifically, a metal plate, preferably made from steel and more preferably from stainless steel, is covered with a photo resist material that is capable of becoming water insoluble once cured. The patterns are selected or designed and then reduced to the desired size utilizing any of a number of suitable techniques such as photographic techniques, placed over the metal plate, and the photo resist material is cured. The metal plate or cliché is subsequently washed with an aqueous solution and the resulting image or pattern is etched into the metal plate to a suitable depth, for example, about twenty (20) microns. Once the cliché s are fabricated, a multi-step process is utilized to manufacture the cosmetic contact lens as described below.

FIG. 19 illustrates a general overview of the pad printing process utilized in the manufacturing process. The first step, 1902, in the process is filing of the cliché cavities with the desired colorant. The cliché 1901 comprises a number of cliché cavities 1903 with the particular pattern etched therein. The second step, 1904, in the process involves the removal of excess ink or colorant from the surface of the cliché s 1901. Excess ink is typically removed from the surface of the cliché s 1901 through the use of a doctoring blade or doctoring blades on a cup 1905. In the third step, 1906, of the process, the colorant is dried on the cliché s 1901. In the fourth step, 1908, of the process, the colorant in the cliché's 1901 is picked up by pads. In the fifth step, 1910, of the process, the colorant is dried or is allowed to dry on the pads. In the sixth step, 1912, of the process, the colorant is transferred from the pads to the front curve surface wherein additional processing is performed as described below. In the seventh step, 1914, of the process, the colorant is dried or is allowed to dry on the front curve surface of the front curve mold half. The process is then repeated for the remaining two effect layers.

FIG. 20 provides a more detailed process description. In the first step, 2002, an unprinted front curve mold for the contact lens is provided. In the second step, 2004, a clear base, i.e. no pigment or dyes is applied to the front curve. The clear base depends on the lens material to be utilized as set forth in greater detail below. In the third step, 2006, ink, including solvents, clear base and pigments is applied to the clear base printed front curve. Once again, this is repeated so that all three layers are applied to the clear base printed base curve. In the fourth step 2008, the printed front curve is then dosed with a reactive monomer mixture, for example, etafilcon-A. In the fifth step, 2010, of the process, the back curve mold for the contact lens is positioned on the front curve mold where it remains for two (2) minutes while the temperature is maintained at seventy (70) degrees C. In the sixth step, 2012, of the process, the reactive monomer mixture between the front and back curve is exposed to visible light for curing. This curing step utilizes visible light at five (5) mW for four (4) minutes at a temperature of seventy (70) degrees C. In the seventh step, 2014, of the process the contact lens from the mold is hydrated for one (1) hour in seventy (70) degrees C. solution of 800 ppm Tween 80 and de-ionized water and for an additional one (1) hour in forty-five (45) degree C. de-ionized water. In the eighth step, 2016, of the process, the contact lens is steam sterilized in its own packaged saline solution for eighteen (18) minutes at a temperature of one hundred twenty-four (124) degree C. It is important to note that the above-described process has been simplified for ease of explanation.

As set forth above, the lens forming material comprises etafilcon A. Etafilcon A is a well-known and patented material for manufacturing contact lenses. Etafilcon A is a copolymer of 2-hydroxyethal methacrylate and methacrylic acid cross-linked with 1, 1, 1-trimethyol propope trimethacrylate and ethylene glycol dimethacrylate. Etafilcon A is utilized in a number of contact lenses available from VISTAKON® a division of Johnson & Johnson Vision Care, Inc. It is important to note that while etafilcon A is utilized in the exemplary embodiments described herein, any suitable lens forming material may be utilized. For etafilcon A, the preferred binding polymers are a random block copolymer of HEMA, and MAA or a homopolymer of HEMA. The weight percentages, based on the total weight of the binding polymer, of each component in these embodiments is about 93 to about 100 weight percent HEMA and about 0 to about 2 weight percent MAA.

With the above described process or similar process, the pigments are enclosed within the clear base and the bulk material forming the lens. In other words, all pigmented layers are enclosed within the lens material and never contact the eye.

Although shown and described in what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be constructed to cohere with all modifications that may fall within the scope of the appended claims.

What is claimed is:

1. An eye enhancement contact lens, the eye enhancement contact lens comprising:
   a clear base material;
   a first design graphic deposited on at least a portion of the clear base material;
   a second design graphic deposited on at least a portion of the first design graphic and on at least a portion of the clear base material;
   a third design graphic deposited on at least a portion of the second design graphic, on at least a portion of the first design graphic and on at least a portion of the clear base material, wherein the first, second and third design graphics create overlapping and non-overlapping layers, wherein the first, second and third design graphics are each translucent; and
   bulk lens material, wherein the first, second and third design graphics being enclosed within the bulk lens material and the clear base material.

2. The eye enhancement contact lens according to claim 1, wherein the first, second and third design graphics are positioned to form a substantially annular arrangement.

3. The eye enhancement contact lens according to claim 2, wherein the substantially annular arrangement includes varying degrees of translucency based on the degree of overlap between the first, second and third design graphics.

4. The eye enhancement contact lens according to claim 1, wherein at least one of the first, second and third design graphics comprises a first pattern that surrounds an outer diameter of an iris of a wearer's eye and is configured to enhance a limbal region of a wearer's eye.

5. The eye enhancement contact lens according to claim 4, wherein the first pattern includes a portion that extends into a region corresponding to a wearer's iris.

6. The eye enhancement contact lens according to claim 5, wherein the portion that extends into a region corresponding to a wearer's iris is configured to enhance the wearer's iris.

7. The eye enhancement contact lens according to claim 1, wherein at least one of the first, second and third design graphics comprises a second pattern configured to enhance an iris region of a wearer's eye.

8. The eye enhancement contact lens according to claim 7, wherein the second pattern includes a portion that extends into a region corresponding to a wearer's limbal region.

9. The eye enhancement contact lens according to claim 8, wherein the portion that extends into a region corresponding to a wearer's limbal region is configured to enhance a wearer's limbal region.

10. The eye enhancement contact lens according to claim 1, wherein at least one of the first, second and third design graphics comprises a third pattern configured to enhance an iris region of a wearer's eye.

11. The eye enhancement contact lens according to claim 10, wherein the third pattern includes a portion that extends into a region corresponding to a wearer's limbal region.

12. The eye enhancement contact lens according to claim 11, the portion that extends into a region corresponding to a wearer's limbal region is configured to enhance a wearer's limbal region.

13. An eye enhancement contact lens, the eye enhancement contact lens comprising:
   an optic zone;
   a peripheral zone surrounding the optic zone; and
   a substantially annular design arrangement formed from a first design graphic deposited on a clear base layer, a second design graphic deposited on at least a portion of the first design graphic and on at least a portion of the clear base layer and a third design graphic deposited on at least a portion of the second design graphic, on at least a portion of the first design graphic and on at least a portion of the clear base layer, and wherein the first, second and third design graphics create overlapping and non-overlapping layers, wherein the first, second and third design graphics are each translucent, the substantially annular design arrangement being positioned within the peripheral zone, wherein the first, second and third design graphics are enclosed within a bulk lens material and the clear base layer.

* * * * *